US006975423B2

(12) United States Patent
Koakutsu et al.

(10) Patent No.: US 6,975,423 B2
(45) Date of Patent: Dec. 13, 2005

(54) PRINTING APPARATUS AND A CONTROL METHOD THEREFOR

(75) Inventors: Naohiko Koakutsu, Suwa (JP); Kazuhisa Aruga, Suwa (JP); Masayo Miyasaka, Suwa (JP); Takuya Hyonaga, Suwa (JP); Takaaki Akiyama, Suwa (JP); Mitsuaki Teradaira, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 969 days.

(21) Appl. No.: 09/760,367

(22) Filed: Jan. 12, 2001

(65) Prior Publication Data

US 2001/0024585 A1 Sep. 27, 2001

Related U.S. Application Data

(63) Continuation-in-part of application No. 09/430,840, filed on Nov. 1, 1999, now abandoned, which is a continuation of application No. 08/768,731, filed on Dec. 18, 1996, now Pat. No. 5,987,224, which is a continuation-in-part of application No. 09/361,659, filed on Jul. 27, 1999, which is a continuation of application No. 08/730,694, filed on Oct. 11, 1996, now abandoned, which is a continuation-in-part of application No. 08/335,604, filed on Nov. 8, 1994, now Pat. No. 5,594,653.

(30) Foreign Application Priority Data

| | | |
|---|---|---|
| Nov. 8, 1993 | (JP) | 5-278637 |
| Nov. 8, 1993 | (JP) | 5-278638 |
| Nov. 8, 1993 | (JP) | 5-278939 |
| Oct. 13, 1995 | (JP) | 7-265881 |
| Dec. 18, 1995 | (JP) | 7-329349 |
| Mar. 14, 1996 | (JP) | 8-57941 |
| Mar. 26, 1996 | (JP) | 8-69645 |

(51) Int. Cl.$^7$ .......... G06F 15/00
(52) U.S. Cl. .......... 358/1.16; 358/400; 358/406; 358/407; 358/1.15

(58) Field of Search .......... 358/1.16, 400, 358/406, 407, 442, 468, 1.15, 1.17

(56) References Cited

U.S. PATENT DOCUMENTS

| | | | |
|---|---|---|---|
| 4,396,976 A | 8/1983 | Hyatt | 700/1 |
| 4,438,507 A | 3/1984 | Nakajima | 358/1.16 |
| 4,452,136 A | 6/1984 | Boynton et al. | 358/1.1 |
| 4,454,575 A | 6/1984 | Bushaw et al. | 358/403 |

(Continued)

FOREIGN PATENT DOCUMENTS

| | | |
|---|---|---|
| DE | 38 11 661 | 10/1998 |
| EP | 0 470 782 | 2/1992 |
| EP | 0 608 106 A1 | 7/1994 |
| EP | 0 654 757 A2 | 5/1996 |

(Continued)

OTHER PUBLICATIONS

Receipt, journal, slip printer TM–930II series Operator's Manual.

*Primary Examiner*—Twyler Lamb
(74) *Attorney, Agent, or Firm*—Mark P. Watson

(57) ABSTRACT

A printing apparatus includes a data receiver that receives command data from a host device and a memory that stores the command data received by the data receiver. A printer controller reads out the command data stored in the memory in a first-in-first-out order and controls the printing apparatus in accordance with the command data. A command detector is provided to detect predetermined command data within the command data received by the data receiver without storing the command data in the memory or while or before command data is stored in the memory. An off-line recovery controller enables the printing apparatus to recover from an off-line state in accordance with the predetermined command data detected by the command detector.

56 Claims, 29 Drawing Sheets

U.S. PATENT DOCUMENTS

| | | | | | |
|---|---|---|---|---|---|
| 4,786,920 | A | | 11/1988 | Igarashi | 346/134 |
| 4,877,345 | A | | 10/1989 | Hori | 400/342 |
| 4,933,772 | A | | 6/1990 | Ikenoue et al. | 358/300 |
| 4,943,936 | A | | 7/1990 | Hirai et al. | 358/1.18 |
| 4,989,163 | A | | 1/1991 | Kawamata et al. | 358/1.6 |
| 4,991,972 | A | | 2/1991 | Ikenoue et al. | 358/1.14 |
| 5,088,033 | A | | 2/1992 | Binkley et al. | 703/24 |
| 5,124,809 | A | | 6/1992 | Koishikawa | 358/400 |
| 5,140,674 | A | | 8/1992 | Anderson et al. | 358/1.12 |
| 5,214,750 | A | | 5/1993 | Minowa et al. | 358/1.12 |
| 5,398,305 | A | | 3/1995 | Yawata et al. | 358/1.1 |
| 5,418,891 | A | | 5/1995 | Yang | 358/1.15 |
| 5,428,714 | A | | 6/1995 | Yawata et al. | 358/1.13 |
| 5,546,514 | A | | 8/1996 | Nishiyama | 358/1.12 |
| 5,557,369 | A | | 9/1996 | Shiga et al. | 399/1 |
| 5,572,630 | A | | 11/1996 | Azuma et al. | 358/1.12 |
| 5,584,590 | A | | 12/1996 | Ito et al. | 400/605 |
| 5,594,653 | A | | 1/1997 | Akiyama et al. | 700/117 |
| 5,604,844 | A | | 2/1997 | Nishiyama | 358/1.12 |
| 5,648,812 | A | | 7/1997 | Igarashi | 347/262 |
| 5,706,411 | A | | 1/1998 | McCormick et al. | 358/1.14 |
| 5,720,015 | A | | 2/1998 | Martin et al. | 358/1.15 |
| 5,742,327 | A | | 4/1998 | Igarashi | 347/262 |
| 5,755,521 | A | | 5/1998 | Ito et al. | 400/605 |
| 5,987,224 | A | | 11/1999 | Koakutsu et al. | 358/1.12 |
| 6,055,361 | A | | 4/2000 | Fujita et al. | 358/1.15 |
| 6,198,985 | B1 | | 3/2001 | Miyasaka et al. | 700/213 |
| 6,205,363 | B1 | | 3/2001 | Miyasaka et al. | 700/9 |
| 6,208,906 | B1 | | 3/2001 | Miyasaka et al. | 700/79 |
| 6,360,135 | B1 | | 3/2002 | Miyasaka et al. | 700/213 |
| 6,362,896 | B1 | * | 3/2002 | Miyasaka et al. | 358/1.16 |
| 6,434,445 | B2 | | 8/2002 | Miyasaka et al. | 700/213 |
| 6,453,208 | B2 | | 9/2002 | Miyasaka et al. | 700/79 |

FOREIGN PATENT DOCUMENTS

| | | |
|---|---|---|
| EP | 0 750 251 | 12/1996 |
| JP | 60-52383 | 3/1985 |
| JP | 60-104361 | 6/1985 |
| JP | 60-122645 | 7/1985 |
| JP | 61-9723 | 1/1986 |
| JP | 61-175816 | 8/1986 |
| JP | 61-291330 | 12/1986 |
| JP | 62-95279 | 5/1987 |
| JP | 62-161571 | 7/1987 |
| JP | 63-21178 | 1/1988 |
| JP | 63-175918 | 7/1988 |
| JP | 63-210958 | 9/1988 |
| JP | 1-144189 | 6/1989 |
| JP | 1-281551 | 11/1989 |
| JP | 1-302453 | 12/1989 |
| JP | 2-24183 | 1/1990 |
| JP | 2-289374 | 11/1990 |
| JP | 3-155974 | 7/1991 |
| JP | 3-214228 | 9/1991 |
| JP | 4-313188 | 11/1992 |
| JP | 5-8472 | 1/1993 |
| JP | 5-112004 | 5/1993 |
| JP | 5-169739 | 7/1993 |
| JP | 5-346837 | 12/1993 |
| JP | 6-47992 | 2/1994 |
| JP | 6-210907 | 8/1994 |
| JP | 6-255191 | 9/1994 |
| JP | 7-186494 | 7/1995 |
| JP | 9-164746 | 6/1997 |
| WO | 82 01609 | 5/1982 |

* cited by examiner

PRINTING APPARATUS AND A CONTROL METHOD THEREFOR

CONTINUING APPLICATION DATA

This application is a continuation in part of:

U.S. patent application Ser. No. 09/430,840, filed Nov. 1, 1999 now abandoned, which is continuation of U.S. patent application Ser. No. 08/768,731, filed Dec. 18, 1996, now U.S. Pat. No. 5,987,224, and U.S. patent application Ser. No. 09/361,659, filed Jul. 27, 1999, which is a continuation of Ser. No. 08/730,694, filed on Oct. 11, 1996 now abandoned, which is a continuation-in-part of U.S. application Ser. No. 08/335,604, filed on Nov. 8, 1994, now U.S. Pat. No. 5,594,653.

The contents of each of which are incorporated herein in their entirety by reference.

BACKGROUND OF THE INVENTION

1. Field of the Invention

The present invention relates to a printer that executes a printing process based on commands and other data received from a host device, and relates specifically to a printer that interrupts the printing process until consumable materials that have been depleted are replenished and then executes a resume-printing process.

2. Description of the Related Art

The standard configuration for the data input/output device, host device, and printer in the point of sale or POS/ECR field has conventionally been an integrated, stand-alone system. In more recent years, however, faster data processing and more flexible system architectures have led to the development and wide-spread acceptance of distributed systems in which the data input/output device, host device, and printer are separated from each other and can be used in separate locations.

The printers used in such distributed systems are generally called "terminal printers." An example of a POS/ECR system using such a terminal printer in a restaurant or other food service business is described below.

The printer used in this application is called a "kitchen printer." When the waiter or waitress receives a customer order and enters the order to a hand-held data entry device, the order is transmitted immediately to a host device and printed to hard copy by the kitchen printer located in the kitchen. This system helps prevent errors because the operator can process the information while viewing the print content, thereby facilitating the management and processing of goods sold. These benefits have led the way to similar systems being introduced in a variety of businesses.

It is often the case, however, that cooking appliances, safes, or other relatively more important equipment be given priority in selecting installation space. This has increased demand for compact printers with a small footprint and space requirements, and compact printer designs necessarily limit the on-line availability of consumable printing materials, i.e., the size of the paper rolls that can be installed and the amount of ink in the ink cartridges. The host device is also usually located in a separate place due to restrictions in the operating environment. In addition, the printer typically prints large volumes of information, frequently resulting in consumable printer supplies being depleted while the system is in use.

The amount of paper that is left on the roll is detected using a paper-out sensor that detects when there is no more paper on the roll and a near-end sensor that detects when there is little paper left on the roll; and the amount of remaining ink left in the ink cartridge can be likewise monitored using a remaining-ink detector. When these consumable materials are depleted, the printing process is immediately stopped and the printer enters an off-line state in which additional print data cannot be received by the printer or storage of print data transferred to the printer is not assured. Loss of data sent from the host device is prevented in this case by notifying the host device that the printer is off-line.

When the host device is notified that the printer is off-line, an indicator is flashed or a buzzer is sounded to notify the operator that some or all consumable materials need replenishing. Once the consumable materials have been replenished, an on-line switch is pressed either intentionally, by closing the roll paper cover or ink cartridge cover to notify the host device that the printer is again on-line and printing can be resumed. More specifically, the operator must restore the printer to the on-line state and resume the printing process after adding roll paper or replacing the ink cartridge by manually operating an on-line switch. Alternatively, when one of the above covers is closed after replenishing the consumable materials, a cover sensor can detect that the cover is closed, restore the printer to the on-line state, and thereby enable resumption of the printing process.

When the roll paper is replaced it may also be necessary for the operator to operate a paper feed switch to advance a torn or discolored roll paper leader before resetting the printer to the on-line state by operating the on-line switch. Depending upon the type of ink cartridge used, ink build-up around the ink nozzles from which the ink is ejected may cause failure in ink ejection. In such cases the operator must operate a switch after installing a new ink cartridge to flush out any ink build-up, and then restore the printer to the on-line state by means of the operation described above.

While the above examples specifically address roll paper and ink cartridge depletion, similar problems occur with conventional thermal transfer printers that use a consumable ink ribbon. When the ink ribbon is depleted or nearly depleted, the printer goes off-line, and the operator must replace the ribbon and then restore the printer to the on-line state by means of an operation as described above.

At the same time, however, demand for low cost and high reliability have driven the need to reduce the number of parts and components while maintaining functionality. This has led to a reassessment of the need for cover sensors and dedicated on-line switches as used for the operations described above.

Technologies for eliminating such on-line switches and cover sensors has been disclosed in Japanese laid-open patent number H6-47992 (47992/94-). The method of this technology assumes that the ink or other consumable material is replenished within a known predefined period after the printer goes off-line, and automatically restores the on-line status when this period is up.

The problem with this method is that the actual time required to replace the roll paper or other consumable materials varies according to the operator and the operator's familiarity with the printer, and it may be necessary or desirable to replace plural consumable materials at the same time, e.g., replace the ink cartridge at the same time as the roll paper. As a result, it may not always be possible to resume printing within a constant period of time. If printing is resumed before printing is actually possible, the information will not be correctly printed and print data may be lost.

If this method is implemented with a kitchen printer as described above or cash register, loss of print data can result in business disruptions and problems.

OBJECTS OF THE INVENTION

Therefore, it is an object of the present invention to overcome the aforementioned problems.

It is a further object of the present invention to providing a printer from which a dedicated on-line switch and cover sensors are eliminated while retaining functionality, preventing printer data loss, and enabling restoration of the on-line state.

SUMMARY OF THE INVENTION

To achieve the above objects, a printing apparatus according to the present invention uses a transport mechanism for transporting the print medium and a printing means for printing to the print medium, is configured to accomplish the printing process based on data received from a host device, and selectively switches between a first state assuring processing of the host data, i.e., an on-line state, and a second state in which processing the host data is not assured, i.e., an off-line state, and notifies the host device of the currently selected state. The printing apparatus accomplishes this by means of a consumable materials detection means such as a paper-end sensor or remaining-ink sensor to detect the consumption or absence and the replenishment or presence of consumable materials, such as roll paper and ink, consumed in the printing process; an operating means that can be manually operated and selectively accomplishes a first function, e.g., an on-line function, for commanding a transition from the second (off-line) state to the first (on-line) state, and a second function for specifying the process to be executed by the printing apparatus when the consumable materials are replenished, e.g., a paper feed operation or ink nozzle refresh operation; a first state transition means for causing the printing apparatus to go off-line based on the detection of consumption or absence of consumable materials by the consumable materials detection means; and a function selecting means for selecting the on-line function of the operating means based on the detection of replenishment or presence of consumable materials by the consumable materials detection means after the first state transition means causes the printing apparatus to go off-line.

The first state is used herein in reference to the on-line state, which in the present invention means the state in which the printing process is executed. In a printing apparatus comprising internal data storage for receive data buffer, the data to be printed is read from the internal data storage and printed on the print medium in this state. In a printing apparatus not equipped with internal data storage, the printing process executed in this state prints the data received from the host device directly on the print medium.

The second state is used herein in reference to the off-line state, which is normally the state in which data transfers from the host device to the printing apparatus are stopped. When data is received in this state, print data is usually lost because any internal storage typically overflows or the print mechanism does not function. This state is therefore not necessarily a state in which data is not received from the host device.

The depletion or replenishment states may also simply mean that the consumable material is or is not present, and the consumable materials detection means may therefore simply be sensors detecting whether or not the consumable materials are present.

As a result, it is possible to provide a function, i.e., an on-line reset function, for restoring the printing apparatus to the on-line state when the operating means is operated after the operator replenishes the depleted consumable material when consumable materials consumed by the printing process are depleted and the printing apparatus goes off-line based on depletion detection by the consumable materials detection means.

For example, a paper-end sensor can be used as the consumable materials detection means for detecting depletion of the consumable print medium, i.e., printer paper, and a paper feed switch can be used as the operating means. In this case the primary function of the paper feed switch, which is to advance the print medium, is the process to be executed by the printing apparatus when the consumable roll paper is replenished. This makes it possible when the roll paper or other print medium is depleted and the printing apparatus goes off-line for the printing apparatus to return on-line and continue the printing process normally once the operator replenishes the print medium and operates the paper feed switch.

Selection of the on-line command function of the operating means in this case is preferably executed after waiting a predefined time from replenishment or presence detection by the consumable materials detection means. It is therefore possible to use the primary function of the operating means after the consumable materials are replenished, and replenishing the consumable materials can be more reliably accomplished. By operating the paper feed switch within a particular period in the above example, a paper feed operation can be executed, and the print medium can be easily and reliably accomplished.

It is further preferable in this case for the on-line command function to be selected after waiting a particular period after the last operation when the operating means is operated within a particular period. This makes it possible to eliminate the time-based constraints associated with using the primary normal function of the operating means after replenishing the consumable materials. This sequence makes it possible to avoid unintentional selection of the on-line state caused by the paper feed switch changing to the on-line command function while the print medium is still being advanced after replenishing the consumable materials to remove a damaged or discolored paper leader, for example.

It is also possible to select the on-line state while selecting the normal primary function of the operating means after waiting a particular period from selection of the on-line command function of the operating means. When the operator does not have time to operate the operating means or forget it, this makes it possible for the operating means to automatically resume normal operation after waiting a particular period, and the printing apparatus can be returned on-line.

After selecting the on-line function of the operating means in each of these cases, it is also possible to restore the on-line state based on particular command data which is processed immediately after received from the host device irrespective of the on-line or off-line state of the printing apparatus, i.e., real-time command data. It is therefore possible to restore the on-line state either manually or by command, and when the host device is remotely located the printing apparatus can be operated from any of the closer one of the printing apparatus and host device to the operator.

The present invention can also be expressed as a control method for a printing apparatus with the same effects and benefits described above.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The preferred embodiments of the present invention are described below with reference to the accompanying figures.

First Embodiment

Figure 1:
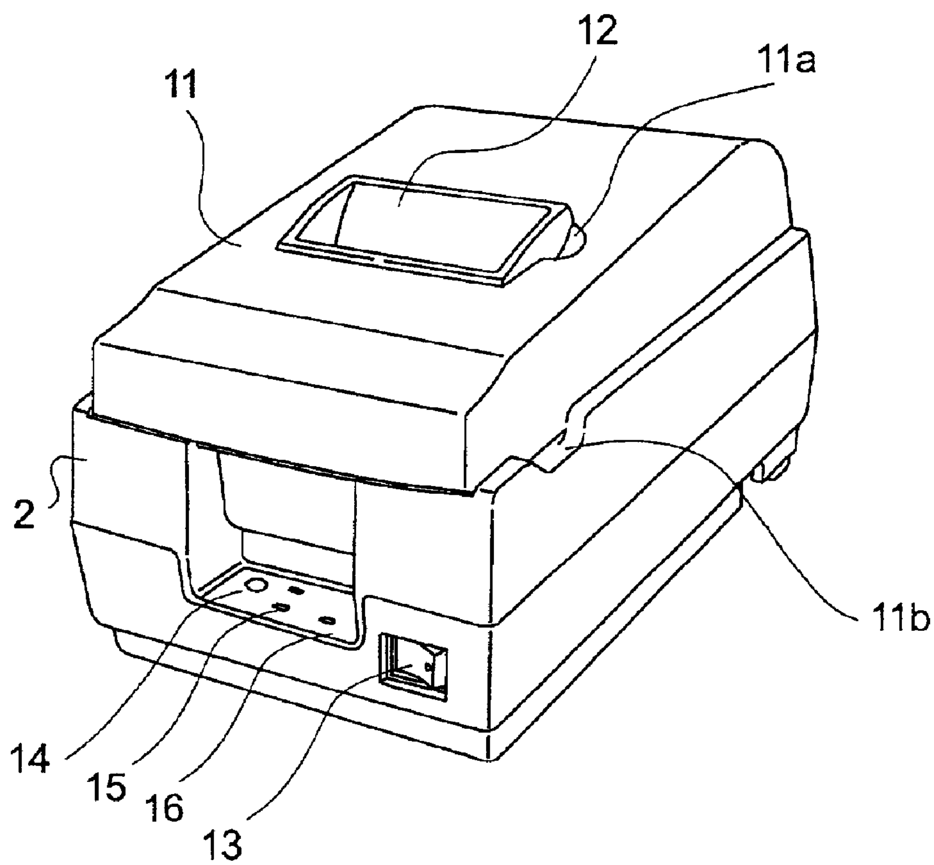
FIG. 1 is a perspective overview of a printer according to the preferred embodiment of the present invention.
Figure 2:
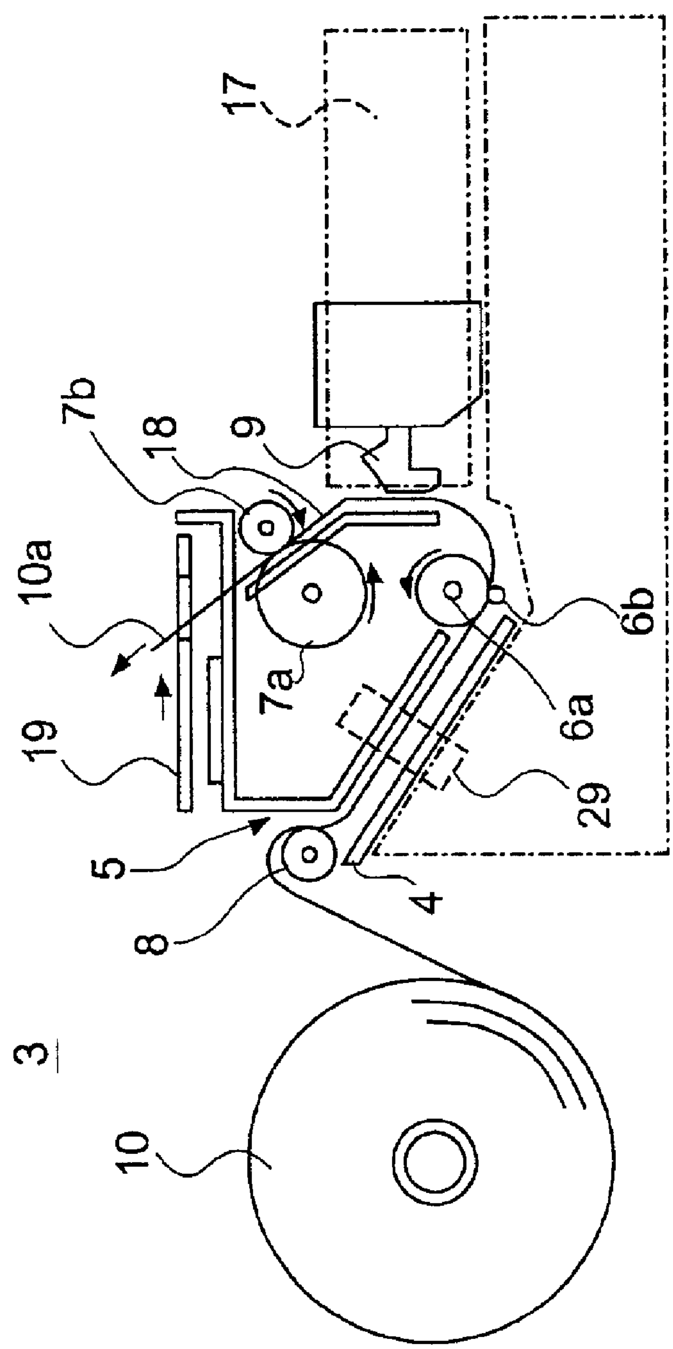
FIG. 2 is a cross sectional view of the printer mechanism used in the first embodiment of the present invention.

FIG. 1 is a perspective view of a printer 2 according to the present invention. Printer 2 comprises, as shown in FIG. 2, a paper transportation mechanism for transporting the roll paper by means of a stepping motor (not shown) and paper transport rollers 7*a* and 7*b*, a print assembly for printing to the roll paper 10 by means of ink ribbon 17 and print head 9, and a conventional paper-end sensor comprising for example a photo interrupter, lever switch, or other detection mechanism.

Referring back to FIG. 1, printer 2 further comprises a cover 11 to prevent the operator from accidentally touching the print assembly. Cover 11 can be opened by lifting up on the front edge near printer operating panel 16, thus rotating cover 11 up on a hinge (not shown) disposed at the opposite end and exposing the inside of the printer. An opening 12, through which the roll paper is ejected after printing, is disposed in the middle of the cover 11. When printer 2 is used for printing receipts, a cut receipt is ejected from opening 12.

Note that it is not essential for cover 11 to be connected to printer 2 by a hinge, and it is also possible to provide cover 11 in any manner allowing the cover 11 to be completely removed to open the printer 2. In this case it is further desirable to provide indents 11*a* in cover 11 on opposite sides of opening 12 and at approximately the center of gravity of cover 11 in the front-back direction. A recess 11*b* is also provided in the side of printer 2 to facilitate replacing the ink ribbon 17.

Printer operating panel 16 and power supply switch 13 are provided, for example, at the front of printer 2. Operating panel 16 is provided recessed from the front face of printer 2 to prevent accidental operation of the printer operating panel controls by the operator, and comprises a switch 14 that can be operated by the operator to advance the roll paper, and an indicator 15 used by the printer 2 to notify the operator of the current printer status. Note that while at least one light-emitting diode (LED) is used for indicator 15 in the present embodiment, the invention shall not be so limited and a liquid crystal display or other type of display may be alternatively used. A conductive rubber switch is also used as switch 14 in this embodiment, but the invention shall not be so limited as a variety of other push-button switches or momentary switches may be used. A power supply switch 13 is also provided recessed from the front face of printer 2 to prevent accidental operation by the operator.

FIG. 2 is a cross-sectional view of the roll paper printer used in the present embodiment. As shown therein roll paper 10 is already loaded into the print mechanism 3. Replenishing the roll paper is accomplished as follows.

The leading edge 10*a* of roll paper 10 is inserted to paper supply opening 5 and slid along paper guide 4. When leading edge 10*a* reaches the position of paper-end sensor 29, leading edge 10*a* of roll paper 10 is detected. If switch 14 is operated after leading edge 10*a* has been detected by paper-end sensor 29, paper transport rollers 6*a*, 6*b* and 7*a*, 7*b* rotate in the directions of the arrows. Paper transport rollers 6*a*, 6*b* thus grab leading edge 10*a* of roll paper 10, and the loading operation begins. When the paper has been advanced a predetermined distance, roll paper 10 passes between print head 9 and platen 18 and is set to the print position. The part of roll paper 10 advanced outside of print mechanism 3 is cut off by cutter 19 disposed above the print mechanism 3. Note that idling roller 8 is also disposed in front of paper supply opening 5 to reduce the paper transportation load originating in the inertial moment of roll paper 10.

Figure 3A:
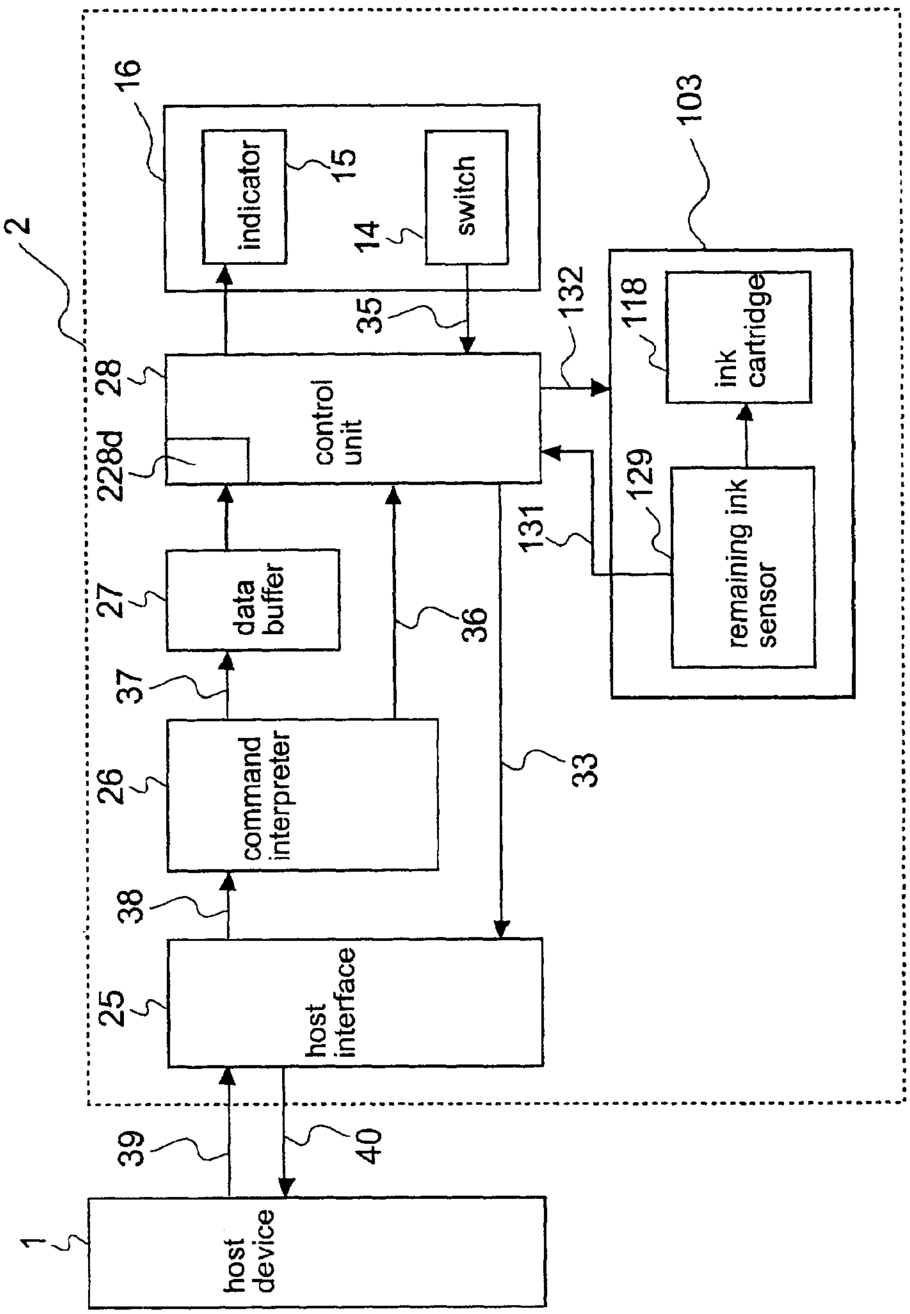
FIGS. 3A and 3B are a functional block diagrams of a printer according to the first, second and third embodiments respectively.
Figure 3B:
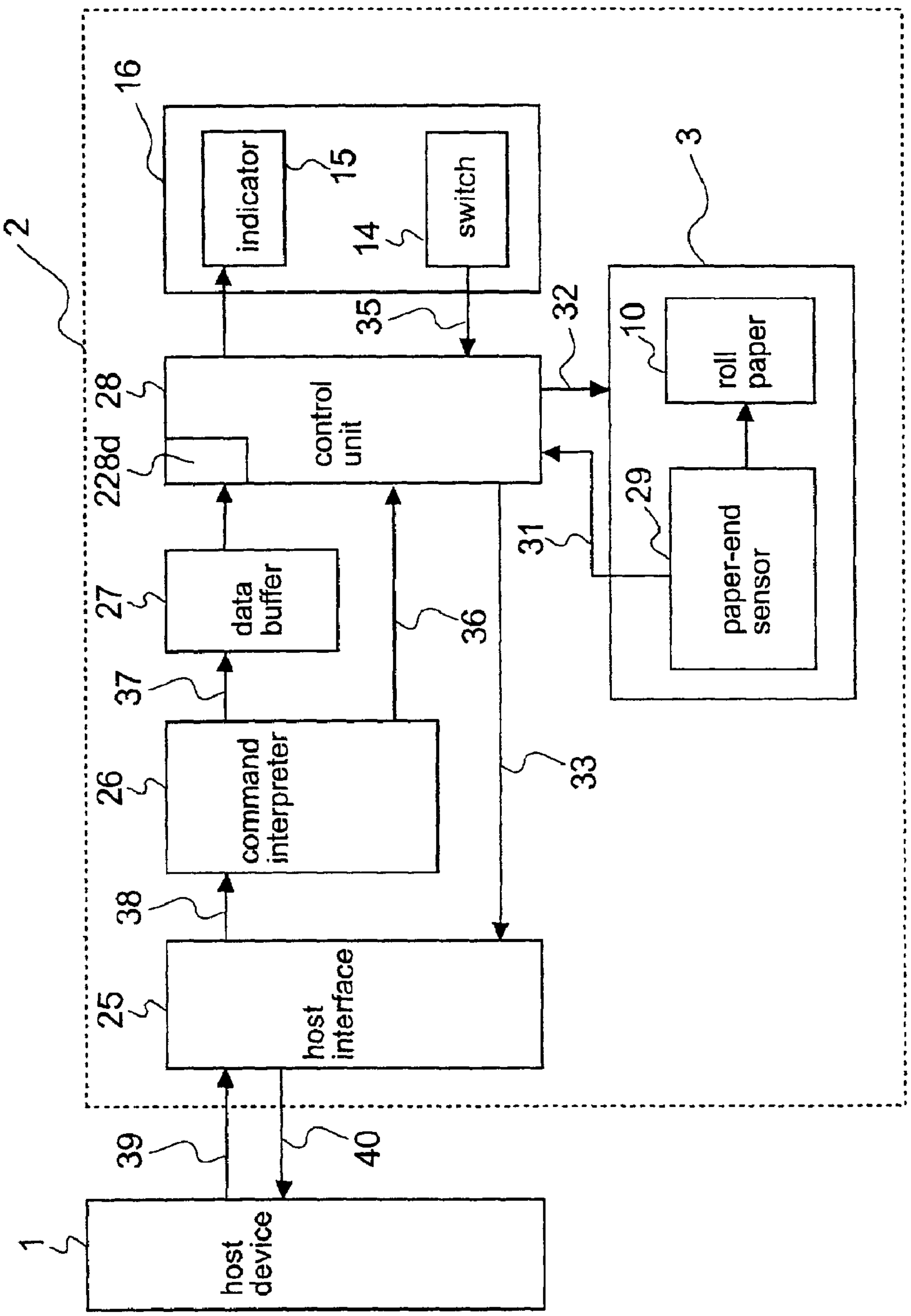

FIG. 3B is a block diagram describing in detail the functionality and operation of printer 2 of the present embodiment. The commands and print data 39 transmitted from host device 1 are received through a host interface 25 inside printer 2 of the present embodiment. The host interface 25 converts the received commands and print data 39 to the internal input data 38 format, and passes the internal input data 38 to command interpreter 26.

By interpreting internal input data 38, command interpreter 26 passes the real-time commands 36 to be executed immediately to control unit 28, and stores all other commands and the specific print data 37 to data buffer 27. Data buffer 27 is a first-in, first-out (FIFO) buffer from which the stored commands or print data 37 are output to and as requested by control unit 28 in the sequence in which they were received from command interpreter 26.

Real-time commands 36 received from command interpreter 26 are given priority execution by control unit 28, but other commands and print data 37 are sequentially read from data buffer 27 and executed. Control unit 28 also arbitrates signal sending and receiving between print mechanism 3 and the printer operating panel 16 as may be necessary for command execution, and passes internal output data 33 to host interface 25 as necessary. The host interface 25 then converts this internal output data 33 to printer status data 40, and forwards the printer status data 40 to host device 1.

Thus as described above, roll paper 10 is loaded to print mechanism 3, and the presence of roll paper 10 in print mechanism 3 is detected by paper-end sensor 29. The detection signal 31*a* output from paper-end sensor 29 is input to control unit 28, and a LOW detection signal 31*a* is used to indicate that no roll paper is loaded.

The control unit 28 also supplies a paper feed signal 32 to instruct print mechanism 3 to advance the roll paper. When paper feed signal 32 is HIGH, roll paper transportation begins and continues until the paper feed signal 32 is LOW again.

The switch signal 35 from switch 14 disposed in printer operating panel 16 is input to control unit 28, which selectively executes any of plural processes in accordance with the supplied switch signal 35.

More specifically, when the printer 2 is on-line, control unit 28 operates print mechanism 3 to print to the roll paper based on the supplied print data and commands. When operation of switch 14 is detected, the function assigned to switch 14 in that operating state is executed. When the end of roll paper 10 is detected by paper-end sensor 29, control unit 28 interrupts the printing process and therefore stops reading data from data buffer 27 to control unit 28. To prevent data loss resulting from the host device 1 continuing to supply command and print data exceeding the storage capacity of data buffer 27 at this time, the printer 2 goes off-line to disable data receiving. This off-line status is thus posted to the host device 1 using printer status data 40.

Note that when in the off-line state command and print data 39 actually continues to be received and interpreted. However, the normal commands and print data 37 converted from command and print data 39 cannot be stored when there is no remaining capacity in data buffer 27, and will therefore be lost. Therefore, when host device 1 is notified that printer 2 is off-line, host device 1 stops sending command and print data 39 immediately, except for real-time commands 36, and any data transmitted thereafter must be separately stored.

The process for replenishing the roll paper in printer 2 is described in detail below with reference to the flow chart in FIG. 4.

When it is first detected at step S61 from paper-out signal 31 that there is no more roll paper loaded, control unit 28 switches to the off-line state in step S62. Both the printing process and reading commands and data from data buffer 27 are interrupted in this off-line state. To therefore prevent an overflow of data buffer 27, control unit 28 informs host device 1 through host interface 25 that printer 2 is off-line, and host device 1 thus stops sending data. If paper-out signal 31 is not detected, the roll paper replenishing process is terminated immediately, and the normal process, i.e., printing, continues.

After an off-line state has been set in step S62, this off-line state is sustained until more roll paper 10 is loaded (step S63). When roll paper 10 is loaded and paper-out signal 31 determining that paper is present, the roll paper 10 loading process is executed in step S64. More specifically, control unit 28 sets paper feed signal 32 to the ACTIVE state, thus forcing print mechanism 3 to advance the paper a known distance. When this loading operation is finished, a timer t1 is set in step S65.

Note that this time t1 is the period for which the function of switch 14 is set to a paper feed function, thereby enabling the operator to transport the roll paper while the printer is off-line. When the roll paper leader is discolored or damaged, this function enables the operator to advance and remove the damaged leader after loading the roll paper.

It is then checked in step S66 whether switch 14 was operated. If it was operated, a paper feed signal is output to print mechanism 3 in step S67 to further feed the paper.

Because this paper feed operation requires a certain amount of time, the timer set to t1 may be reset after the paper is advanced. The control sequence shown as (1) in FIG. 4 is the sequence in which timer t1 is reset as above, i.e., is reset in step S68 to a new value t2 considering the time required for the paper feed operation. Control sequence (2) is the sequence whereby the timer is not reset, and sequence (3) is that in which the timer is reset to the same timer value t1.

If the period measured by the timer is completed by step S69, the function of switch 14 is changed in step S71 to an on-line selector enabling the operator to set the printer on-line again. The timer is then set to time t3 in step S72, and whether switch 14 was operated is checked in step S73. If switch 14 was pressed, control unit 28 determines that the printer 2 was reset to a printing-enabled state, restores the printer 2 on-line in step S77, and resumes data processing and the printing process if data is still stored in data buffer 27. Resumption of the on-line state is of course also reported to the host device 1. In addition, it is meaningless to sustain the on-line selector function of switch 14 once the printer is on-line again, and the function of switch 14 is therefore reset to the normal paper feed function in step S76.

It should be noted that if switch 14 must be pressed to restore the on-line state in the present embodiment, the printing process will not be resumed if the operator forgets to press the switch 14, and command and print data 39 are not sent from host device 1. This results in the entire data processing system containing host device 1 remaining off-line even though replenishing the consumable materials in printer 2 has been completed. The printer 2 is therefore also equipped with the functions described below.

The first additional printer function is a real-time command function commanding recovery of the on-line state. This real-time command is referenced as the "on-line recovery command" below. If the printer 2 determines that the received data is a real-time command as a result of data analysis by the command interpreter 26 (an interrupt process circuit), the real-time command is supplied immediately to the control unit 28 even if unprocessed data is still stored in data buffer 27. The control unit 28 thus executes this real-time command immediately. It should be noted that the command interpreter 26 shall not be limited to an interrupt process circuit, and can also be achieved by means of a regular polling process, a process for detecting a request when a particular process is completed, and other circuits or processes that execute relatively frequently.

This on-line recovery command process is described below with reference to the flow chart in FIG. 4. It should be noted that when the on-line recovery command is processed, a request flag for the on-line recovery process is set by control unit 28. The request flag is to be checked in step S75 of the control sequence shown in FIG. 4

First, it is detected in step S69 whether it is time (i.e., the timer t1 overflows, time Q below) to change the function of switch 14. It is assumed at time Q that the necessary loading and paper feed operations have been completed. If time Q has been reached, there is a high probability that replenishing roll paper 10 has been completed. Therefore, if the on-line recovery command input is detected by checking the request flag at or after time Q (step S75), printing is immediately enabled at step S77, and the on-line state is resumed. However, if the on-line recovery command is received before time Q, processing is paused until time Q (step S75), after which the same process is executed. It is therefore possible to reset the printer to an on-line state by means of a control command supplied from the host device 1 even if the operator forgets to press switch 14 after replenishing the paper.

The second additional printer function is a time-out function. More specifically, if in the flow chart in FIG. 4 switch 14 is not operated (step S73) by time t3 (step S74) after time Q at which the function of switch 14 should be changed and the on-line recovery command input has not been detected (step S75), a printing-process-enabled state is automatically restored by resetting the printer on-line in step S77. It will be obvious that the function of the paper feed switch changes to a normal paper feed function (step S76) at this time. Note that time t3 must be of a duration sufficient to complete the roll paper replenishing task. This makes it possible to restore the printing apparatus to an on-line state after the replenishing task is completed even if switch 14 is not operated.

It should be noted that the values for times t1, t2, and t3 may be set during the printer initialization process or by control commands from the host device 1. These times are measured using a timer integrated to the microprocessor in the present embodiment, and the respective processes are executed by issuing an event interrupt after a particular period of time. The invention shall not be so limited, however, and a time constant output from an integrator or differential circuit, or an NE 555 or other timer IC, may be alternatively used. The time can be set by setting a counter, by detecting the output of a D/A converter, or other known method.

Figure 5:
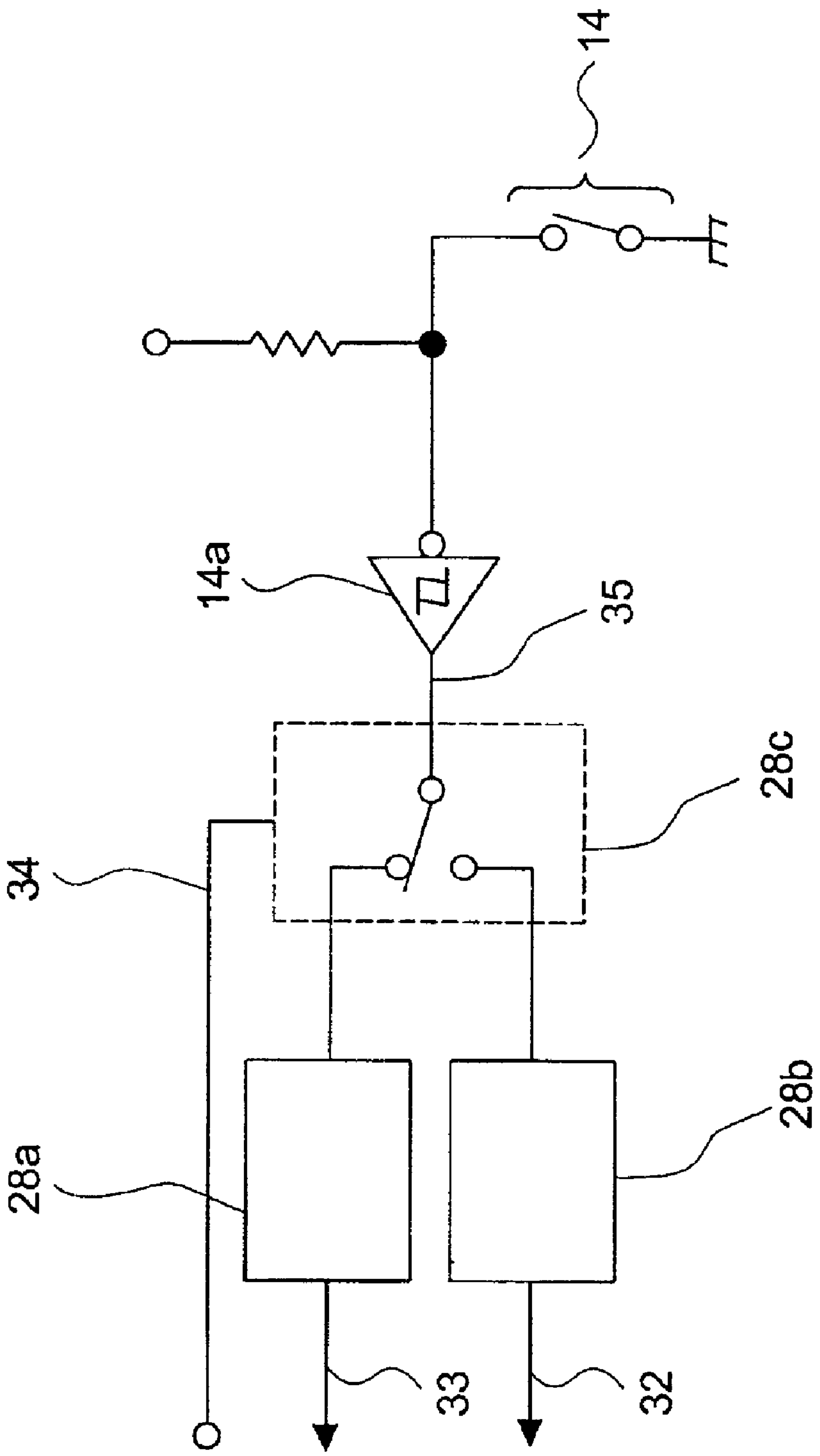
FIG. 5 is a block diagram of the switch function selector in a printer according to the preferred embodiment of the present invention.

FIG. 5 is a block diagram used to describe how the function of switch 14 is changed. Changing the function of switch 14 is accomplished by switching signal selector 28c to selectively connect switch signal 35 to on-line signal generator 28a or paper feed signal generator 28b, and by applying switched-function selector signal 34 controlling to which signal generator 28a or 28b the switch signal 35 should be connected. When switch 14 is pressed and a LOW level signal is input to the input buffer 14a, an inverted signal, i.e., a HIGH signal, is output from input buffer 14a as the switch signal 35. Switch signal 35 is then supplied by signal selector 28c to on-line signal generator 28a or paper feed signal generator 28b according to the switched-function selector signal 34.

More specifically, this is accomplished by changing the interpretation of the switch signal 35 in control unit 28. Control unit 28 is achieved with a microprocessor in the present embodiment, and changing the function of switch 14 is enabled by determining in the program processed by the microprocessor whether the state of the input port to which switch signal 35 applied specifies a paper feed operation or a shift to an on-line state. Alternatively signal selector 28c may be comprised of a data selector of common design to which the switched-function selector signal 34 from the microprocessor is supplied as the selector signal. In this case the data selector outputs are connected to corresponding microprocessor input terminals, and are used as signals requesting the specific functions.

Second Embodiment

While the first embodiment has been described using paper-end sensor 29 to detect the presence of a specific consumable material, i.e., roll paper 10, the present invention shall not be so limited. It is also possible to use a near-end sensor to detect a particular remaining amount of roll paper 10, a ribbon sensor to detect how much ink ribbon remains, or a remaining ink detector to detect how much ink remains in the ink cartridge of an ink jet printer.

Replacement of the ink cartridge is described next below by way of example as another consumable material. Note that further description of steps identical to those used in the roll paper replenishing process is omitted below.

The print mechanism of the present embodiment is designed to print to roll paper using an ink jet head disposed at the end of the ink cartridge. A remaining-ink sensor for detecting how much ink is left in the ink cartridge is disposed in proximity to the ink cartridge. Note that the remaining-ink sensor of the present embodiment uses a pair of electrodes disposed to the ink path inside the ink cartridge to detect the resistance between these electrodes. The invention shall not be limited to this sensor type, however, and other sensors may be used, including infrared sensors whereby an infrared beam is emitted to a reflector placed on the ink bag containing the ink and the reflectance is detected to determine how much ink is left through an amount of the deformation of the ink bag.

Figure 6:
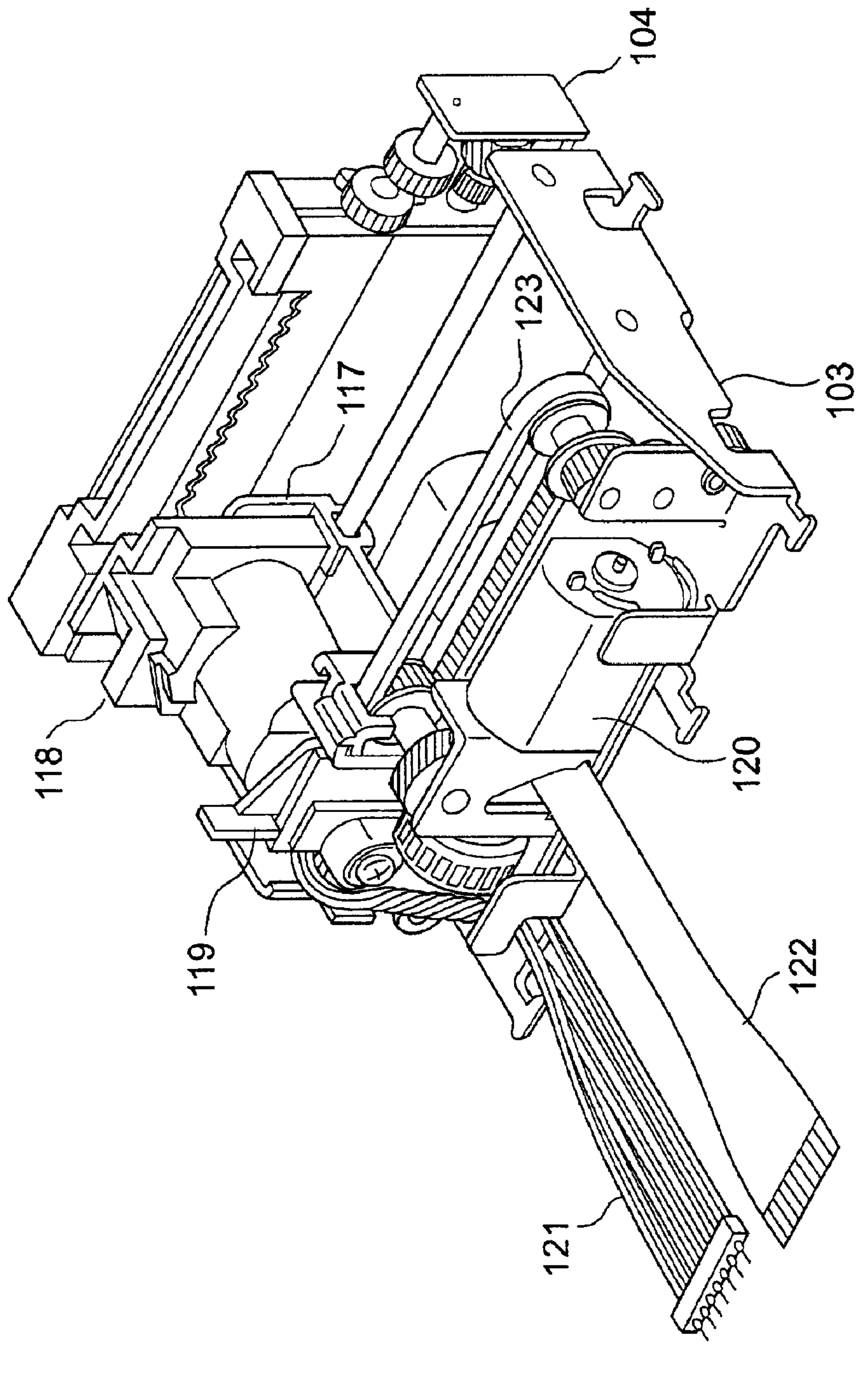
FIG. 6 is a perspective overview of the printer mechanism used in an alternative embodiment of the present invention.

FIG. 6 is an overview of the print mechanism 103 used in the printer 2 of the present embodiment. The roll paper or other recording medium is transported by paper feed unit 104 to the ink cartridge 118 and print head unit. The ink cartridge 118 is transported by carriage 117 and moves in the direction perpendicular to the direction of roll paper transport. It is therefore possible to print to the entire width of the recording paper. Note that this movement is accomplished by transferring the rotation of carriage motor 120 to carriage 117 via belt 123.

Ink cartridge 118 is replaced by operating replacement lever 119. More specifically, by moving replacement lever 119 toward the right side of the paper, carriage 117 and ink cartridge 118 are disengaged, and ink cartridge 118 can thus be easily removed by the operator. After then setting a new ink cartridge 118 to a particular location on carriage 117, the replacement lever 119 is returned to the original engagement position to re-engage ink cartridge 118 and carriage 117.

Plural electrical signals are supplied from the printer control circuit to print mechanism 103 via cables 121 and 122. Cable 121 includes wiring to fixed components of the print mechanism 103, including the carriage drive system location sensors (not shown in the figures) used to detect the print timing of the carriage motor 120, for example. Flexible cable 122 contains the wiring for the ink jet head (cartridge) 118 and remaining-ink sensor (not shown in the figure) mounted on the carriage. Note that wiring to the carriage must use a flexible cable 122 because the carriage travels perpendicularly to the direction of paper transport.

Figure 7:
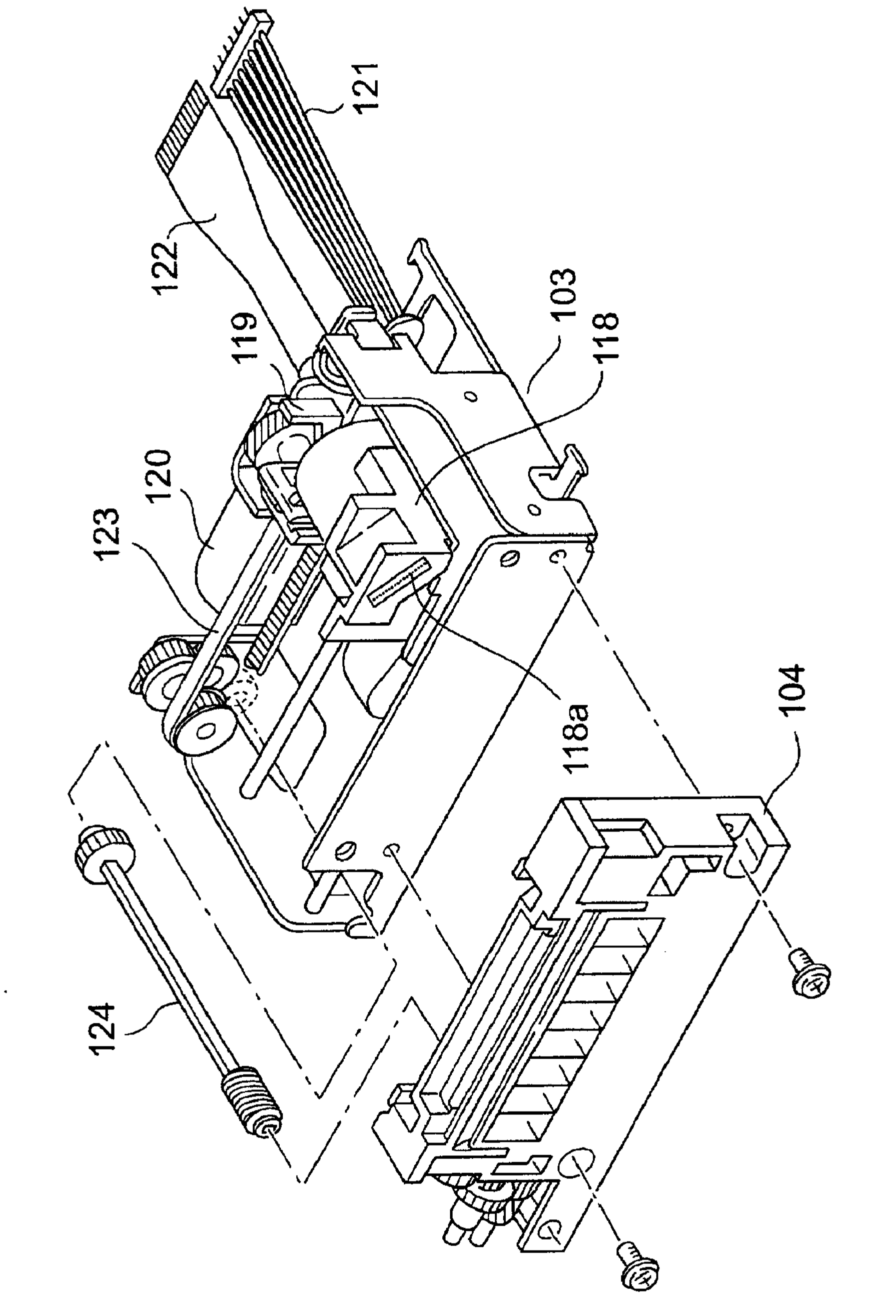
FIG. 7 is a partially exploded view of the printer mechanism used in an alternative embodiment of the present invention.

FIG. 7 is a partially exploded view of the print mechanism 103 and paper feed unit 104 of the present embodiment. As described above print mechanism 103 and paper feed unit 104 are connected via a drive shaft 124 whereby the drive force for the paper feed unit 104 is transferred from the carriage motor 120. However, a gear set used for intermittent paper feeding is provided on the paper feed unit side to advance the paper in line increments. More specifically, the paper is not advanced until the carriage has traveled a one-line equivalent, after which the paper is advanced one line between the completion of one line and the beginning of the next line.

The ink jet head is provided at the one end of the ink cartridge 118 with plural ink nozzles 118*a* exposed. To adjust the relationship between the nozzle pitch (the distance between ink nozzles) and the dot pitch (the distance between the ink dots in the direction of paper travel), the ink jet head is not arrayed parallel to the direction of paper travel but at a specific angle thereto.

FIG. 3A is a block diagram used to describe the functions of this printer 2 and is the same as the block diagram (FIG. 3B) referenced above, and further description of the common elements thereof is omitted below.

As described above, print mechanism 103 comprises an ink cartridge 118 and remaining-ink sensor 129. The amount of remaining ink is detected in this embodiment by measuring the resistance between two electrodes disposed in the ink path inside ink cartridge 118, and the remaining-ink sensor 129 therefore corresponds to these electrodes. Note that the circuit for detecting the remaining ink level based on the resistance between these electrodes can be achieved using various known methods, including a constant current circuit converting this resistance to a voltage and a comparator for comparing the converted voltage with a known voltage value. Remaining ink detection signal 131 from the remaining-ink sensor 129 is input to control unit 28. Though the ink detection signal 131 is then digitized by the circuitry described above in the present embodiment, it should be noted that the ink detection signal 131 may be generated as a digital signal by the remaining-ink sensor 129.

The print mechanism 103 also flushes ink nozzles 118*a* according to a refresh signal 132 from control unit 28. More specifically, when refresh signal 132 is HIGH, the carriage is moved to a position suitable for refreshing the nozzles, and the nozzles are flushed until refresh signal 132 becomes LOW again.

Figure 8:
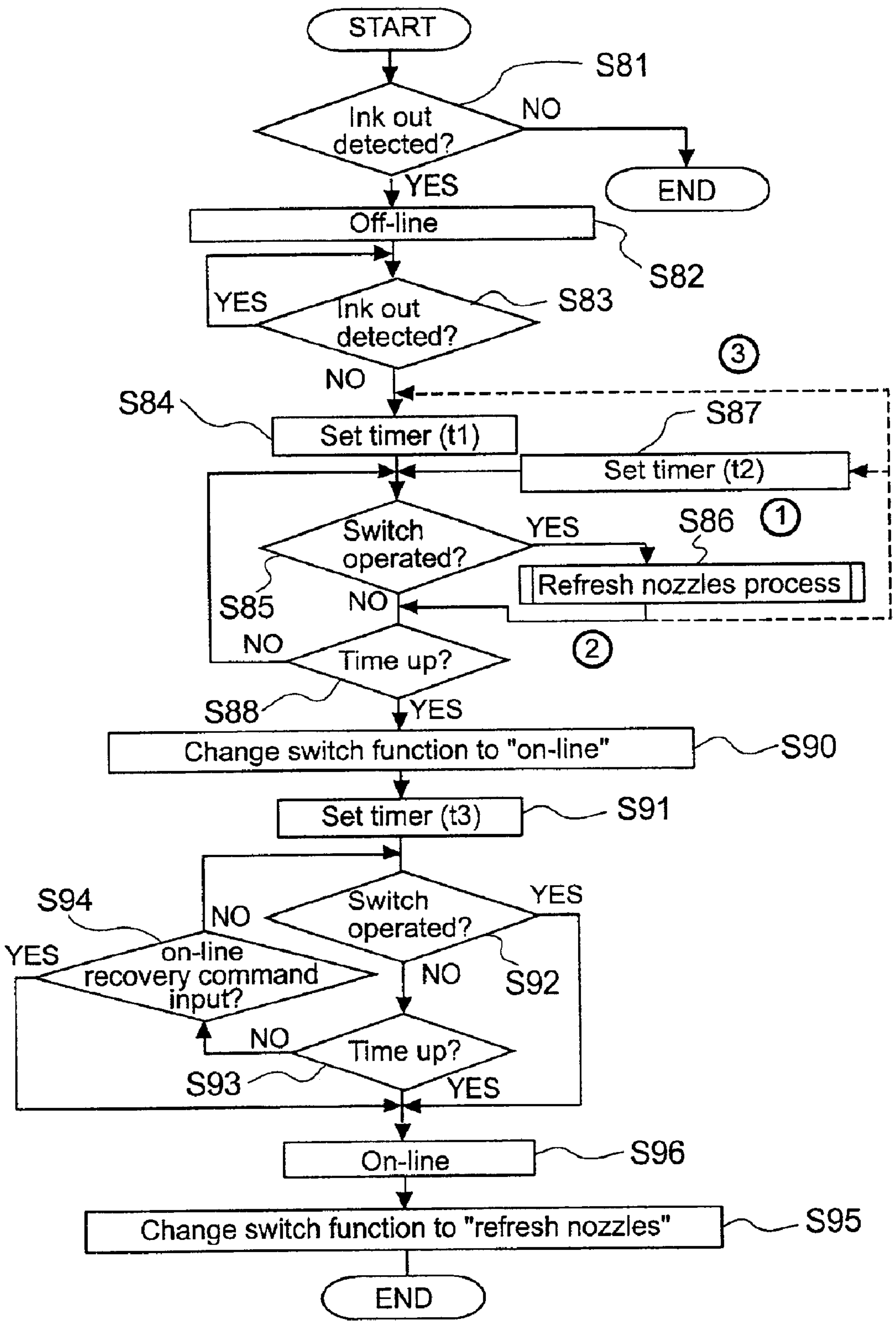
FIG. 8 is a flow chart used to describe the operation of a printer according to the alternative embodiment of the present invention.

The ink cartridge replacement operation of printer 2 according to the present embodiment is described next with reference to FIG. 8. This operation is substantially identical to the roll paper rep operation described above, and only the differences are therefore described below.

Because ink cartridge 118 is carried on carriage 117 in the present embodiment, it could be dangerous to commence the refresh operation immediately after (step S83) ink cartridge replacement is detected. This is because it is not possible to detect whether the operator has removed his hand from ink cartridge 118. Unlike the replenishing operation described above, printer 2 therefore does not begin the refresh operation at this time.

The number of times the nozzles are flushed in the first refreshing operation after the ink cartridge is replaced is preferably greater than the number of times the nozzles are flushed in response to refresh operations initiated by operating a switch. Even with new ink cartridges the ink in the nozzles is often highly viscous, and more flushing operations are therefore required to adequately refresh the nozzles. This also helps prevent increasing the ink volume that must be ejected from the nozzles for normal refresh operations initiated by operating a switch. It is also possible to continue flushing the nozzles for as long as the switch is depressed, thereby enabling the operator to control how much ink is ejected from the nozzles during each refresh operation.

Once the operator presses switch 14 after replacement of ink cartridge 118 has been detected in this embodiment, it is determined that the operator is also ready and the first refresh operation is started. Flushing is also repeated in response to operation of switch 14 until timer t1 overflows.

Third Embodiment

As described above, the present invention provides for a printer that goes off-line when the remaining amount of selected consumable materials is detected by means of sensors to have dropped below certain levels an effective method and apparatus for informing the printer without using dedicated switches that the depleted consumable materials have been replenished. It will also be obvious that those skilled in the related art can by making the necessary adaptations to the first and second embodiments described above apply the present invention to all consumable materials used by such a printer.

The processes executed when it is detected that consumable printer parts or supplies are depleted or nearly depleted have been described above, but it should be noted that the following problems may occur depending upon the operating environment and field of application when a dedicated cover opening sensor and switch for selecting the on-line or off-line state are eliminated. More specifically, when a problem that cannot be evaluated by the printer occurs or the wrong print data is sent to a printer from which such dedicated controls are eliminated, cutting off the power supply to the printer is the only way to stop the printing operation of the printer. When the power is thus turned off, however, all commands and print data already sent to and stored in the printer will be lost. The embodiment of the invention described below therefore relates to an effective apparatus and method whereby the printing process can be interrupted without turning the printer power off.

This problem is resolved in the third embodiment by selectively changing, according to the status of the printing apparatus, the function of the paper feed switch, which is normally used to force the printing apparatus to advance the recording paper. More specifically, once the printer starts a printing process the paper feed switch, refresh switch, and other operator switches are not used until the printing process is completed. It is therefore possible during this time to change the function of these switches to on-line/off-line selector switches. When one of these switches is operated after the printing process starts in the present embodiment, the control unit that controls the printing process changes the printer status from on-line to off-line, interrupting the printing process and resulting in a state in which storing the received data is not assured.

The construction of printer 2 of this embodiment is substantially identical to that of the first embodiment. Only the differences between the first and present embodiments are described below.

First, plural LEDs 15 constituting an LED group are provided to display the plural operating states of the printer as described below. The on/off state of these LEDs 15 is controlled by control unit 28, which also controls the printing process.

A print buffer 228*d* for storing one line of bit-mapped data converted for printing from the print data read from data buffer 27 is also provided in control unit 28. The bit-mapped data stored in print buffer 228*d* is read in the array sequence of the printer elements of print head 9, and is deleted after being read. Storing data to print buffer 228*d* is accomplished parallel to the paper feed, carriage return, or similar operation executed after printing one line is completed. This means that the printing apparatus is either in the process of printing one line or is prepared and standing by to print one line if data is stored in print buffer 228*d*.

The control method of the printing apparatus according to the present embodiment is described next with reference to the flow chart in FIG. 9.

At step S210 printer 2 performs the standard printing process initialization procedure and any other process normally executed thereafter. At step S211 the printing apparatus goes on-line and stands by to receive data. When no data has been received and is stored (step S212) and when switch 14 is operated at this time (step S223), the recording paper is advanced a particular distance or time corresponding to the period or number of times the switch is pressed (step S224).

When the printing apparatus begins receiving data, (step S212) the data in the receive buffer is converted to bit-mapped data and stored to print buffer 228*d*. When all of the data needed to print one line has been buffered, the printing process starts at step S213. It should be noted that a memory area with capacity to store one line of bit-mapped data is used for print buffer 228*d* in the third embodiment because the printer of this embodiment is assumed to be a so-called serial printer. The invention is also applicable to page printers, however, in which case the capacity of print buffer 228*d* is simply increased to store the bit-mapped data for one page.

If switch 14 is not operated at step S214, it is determined in step S215 whether the next line of print data is stored to print buffer 228*d*. If there is no data in print buffer 228*d*, it is determined whether any unprocessed print data remains in the receive data buffer 27 at step S216. If unprocessed print data is in the receive data buffer 27, the printing process is continued (step S213). If there is no unprocessed print data, the printing process stops at step S217. The procedure then loops back to step S212 and the printing apparatus again awaits data from the host device.

If switch 14 is operated during the printing process (step S214), printer 2 processes the switch signal as an emergency stop command and goes off-line at step S220 to block receiving print data. The printing process is also interrupted at step S221, the data already stored in print buffer 228*d* and receive data buffer 27 is protected (step S222), and printer 2 then waits for cancellation of the printing process interrupt from step S225.

Whether switch 14 operates as a paper feed switch or an on-line/off-line selector switch is determined in the present embodiment by whether any data is stored in receive data buffer 27. More specifically, the function of switch 14 is changed simultaneously to the start of data receiving from the host device 1 at step S212.

If printer 2 has been stopped by the operator in the middle of a printing process, it is possible in the present embodiment to resume the interrupted printing process using switch 14. After waiting a particular standby period in step S225, printer 2 checks operation of switch 14 again in step S226. If switch 14 is operated, printer 2 determines that the problem has been corrected and resumes printing with entering the on-line state at step S237.

Note that a printing process in progress can be canceled by host device 1 issuing a real-time command to clear print buffer 228*d* and receive data buffer 27. To enable this, printer 2 checks in step S227 for operation of switch 14 while simultaneously checking for input of a real-time command commanding cancellation of the printing process. If this real-time command is input, a process for clearing the designated buffers is executed at step S218, and the on-line status is entered at step S219. While printer 2 waits for a printing process cancellation command it also monitors the passage of the particular standby period set in step S225 (step S228). If this standby period elapses, an error is announced by, for example, sounding a buzzer or lighting one of the LEDs included in an indicator 15 or other display means in step S229.

In the third embodiment operation of switch 14 during the printing process is monitored in step S214 following the one-line printing process in step S213. The present invention shall not be so limited, however, and an interrupt process or other known means can also be used to monitor switch operation within and parallel to the printing process.

The operator performing the particular operations of the third embodiment should be aware of the current printer status, but other operators may not be similarly aware of the current printer status. More specifically, it is difficult to know whether the printing apparatus is stopped because of an interrupted printing process or because the printing apparatus is waiting for data. This problem can be resolved by adding the control apparatus and method described below.

Figure 9:
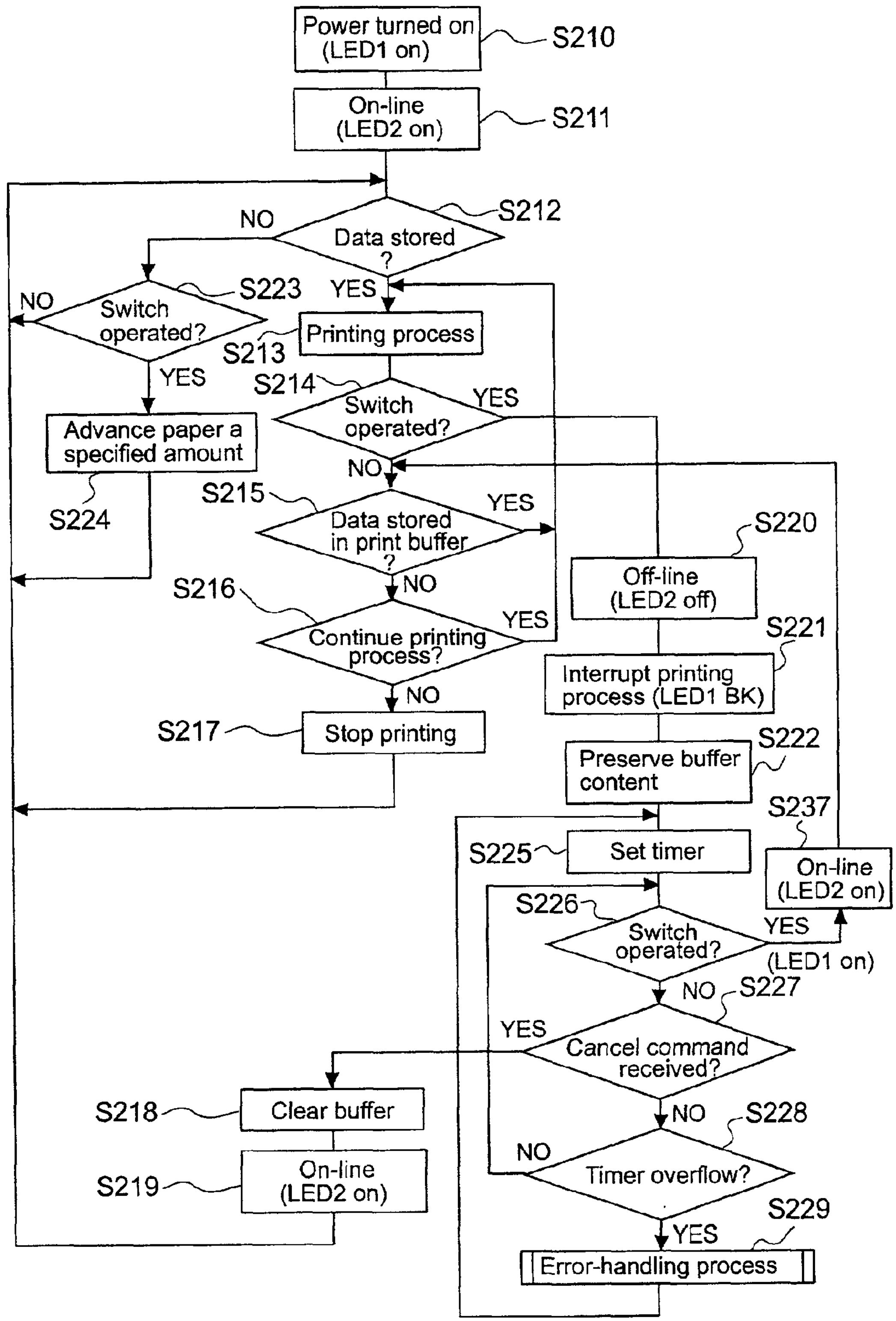
FIG. 9 is a flow chart of the control method of a further alternative embodiment of the present invention.
Figure 10:
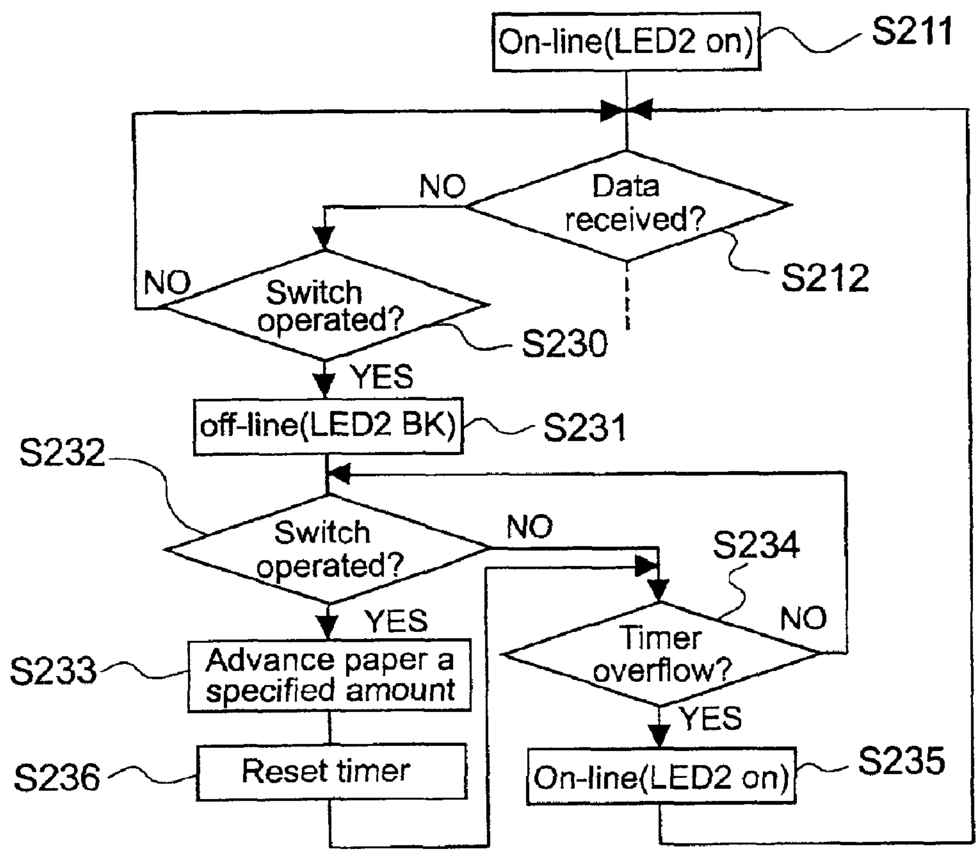
FIG. 10 is a flow chart of the control method of the further alternative embodiment of the present invention.

FIG. 10 is a flow chart of the control method implemented in the control unit 28 of printer 2 according to the present invention. Like process steps are identified by like step numbers in FIGS. 9 and 10, and further description thereof is thus omitted below.

If switch 14 is operated at step S230 while waiting for data in step S212, the printer 2 goes off-line in step S231, a timer is set to measure a known period, and the next switch operation is awaited. If switch 14 is operated in step S232, the paper is advanced a particular distance according to the switch operation (step S233), and the timer is reset (step S236). This keeps the printer off-line for as long as the paper feed operation is continued. However, if there is no switch operation after waiting a particular period (step S234), the on-line status is automatically restored in step S235. The present embodiment thus differs from the above embodiment in that the printer waits for a paper feed command after going off-line from an on-line state.

To distinguish between an emergency stop and a paper feed wait state, indicator 15 on the operating panel may contain a plurality of LEDs. These LEDs are controlled to indicate the appropriate printer status. To accomplish this, the LED states may be defined as follows by way of example only.

LED1, on power switch ON
 blinking emergency stop state

LED2, on on-line state
 blinking off-line, waiting for paper feed

LED3, on consumable materials depleted
 blinking waiting for on-line state after replenishing consumable materials Operation of indicator 15 is controlled by control unit 28. It should be noted that LED blinking can be achieved by means of various known methods, including using a timer interrupt function, for example, built in to the microprocessor constituting control unit 28, and specific description thereof is therefore omitted. The LED controls states accomplished by control unit 28 in the flow charts in FIG. 4, FIG. 9, and FIG. 10 are therefore as described below in the present embodiments.

Figure 4:
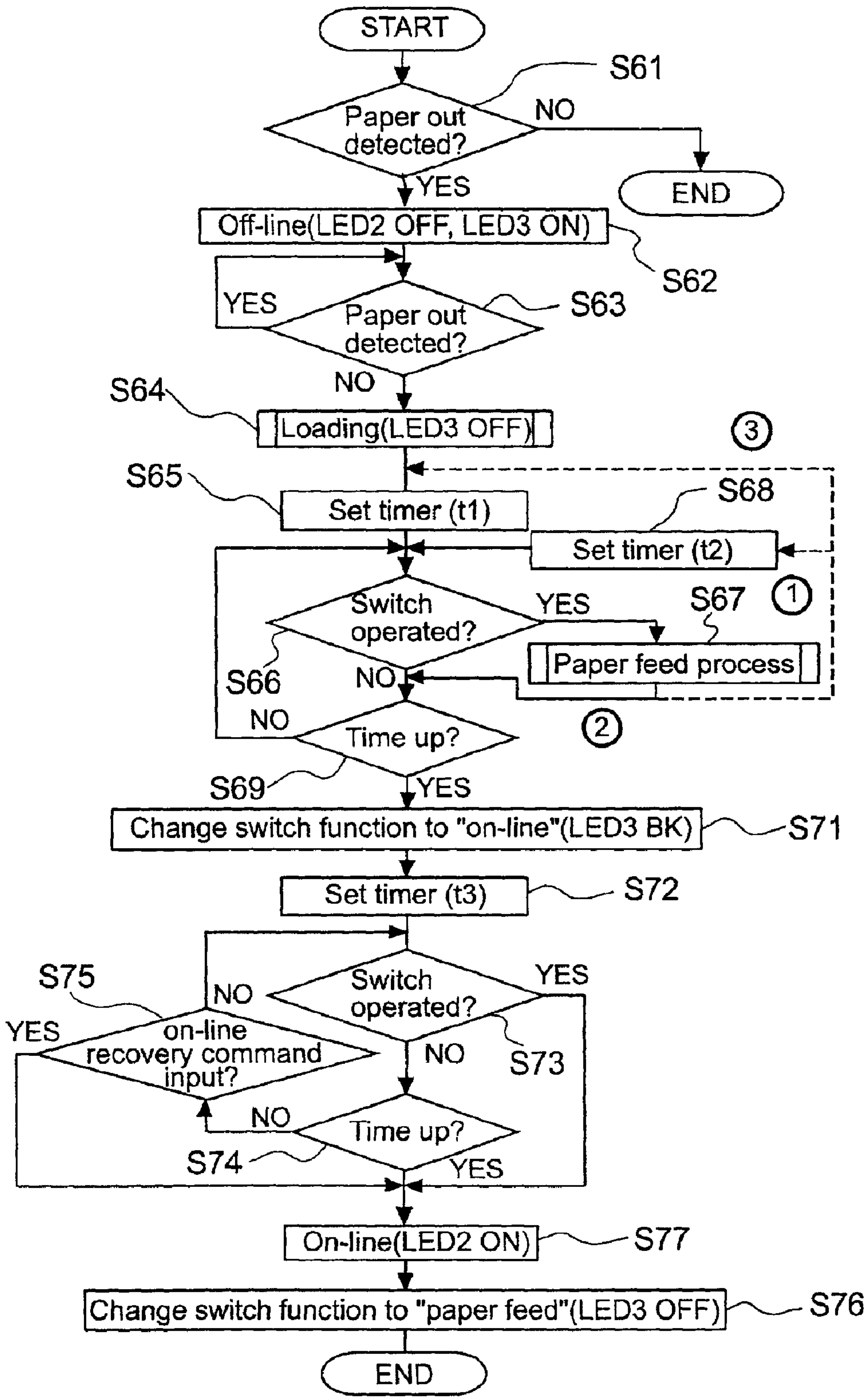
FIG. 4 is a flow chart used to describe the operation of a printer according to the first embodiment of the present invention.

In FIG. 4, step S62, LED2 is off and LED3 is on; LED3 is then off in step S64, blinking in step S71, and off in step S76; and LED2 is on in step S77.

In FIG. 9, LED1 is on in step S210; LED2 is on in step S211, on in step S219 and S237, and off in step S220; LED1 is blinking in step S221, and if it is detected in step S226 that switch 14 was operated, LED1 is on in step S226.

In FIG. 10 LED2 is blinking in step S231, and is on in step S235.

By thus differentiating the LED display states, the operator can quickly determine the operating status of printer 202 at a glance.

It is therefore possible by means of the control apparatus and method described above for a single switch to be selectively used for two functions, e.g., to be used as a paper feed switch and as an on-line/off-line selector switch, and operating errors can be prevented.

It will be obvious that the printer according to the present invention shall not be limited to a serial printer 2 as described above, and the invention can also be applied to parallel printers. The control method of the invention shall also not be limited to consumption of roll paper as described above, and can be adapted to detect consumption of all types of consumable materials, including detecting the service life of ink ribbons used in dot impact printers and thermal transfer printers, and detecting ink consumption in ink jet printers.

By eliminating the need for dedicated on-line switches and cover sensors to restore the printer to an on-line state as described above, the present invention is able to reduce printer size, lower printer cost, and improve printer reliability. It is also possible by means of the invention to appropriately reset the printer to an on-line state even if an on-line selector switch is not operated once a sufficient period has passed since the consumable materials were replenished.

It is also possible to prevent operating errors and achieve reliable operation by means of a display for appropriately displaying the printer status associated with a switch operation.

Fourth Embodiment

A fourth embodiment of the invention is described below with reference to the accompanying figures.

In general, recording paper used in the distribution industry is either cut-sheet or continuous paper. Cut-sheet paper includes irregularly sized, individual voucher forms called slip paper, and multiple-part individual voucher forms, called validation paper, of a relatively regular size. Continuous paper includes journal paper for printing and storing store records, and receipt paper used for simple receipts.

Figure 11:
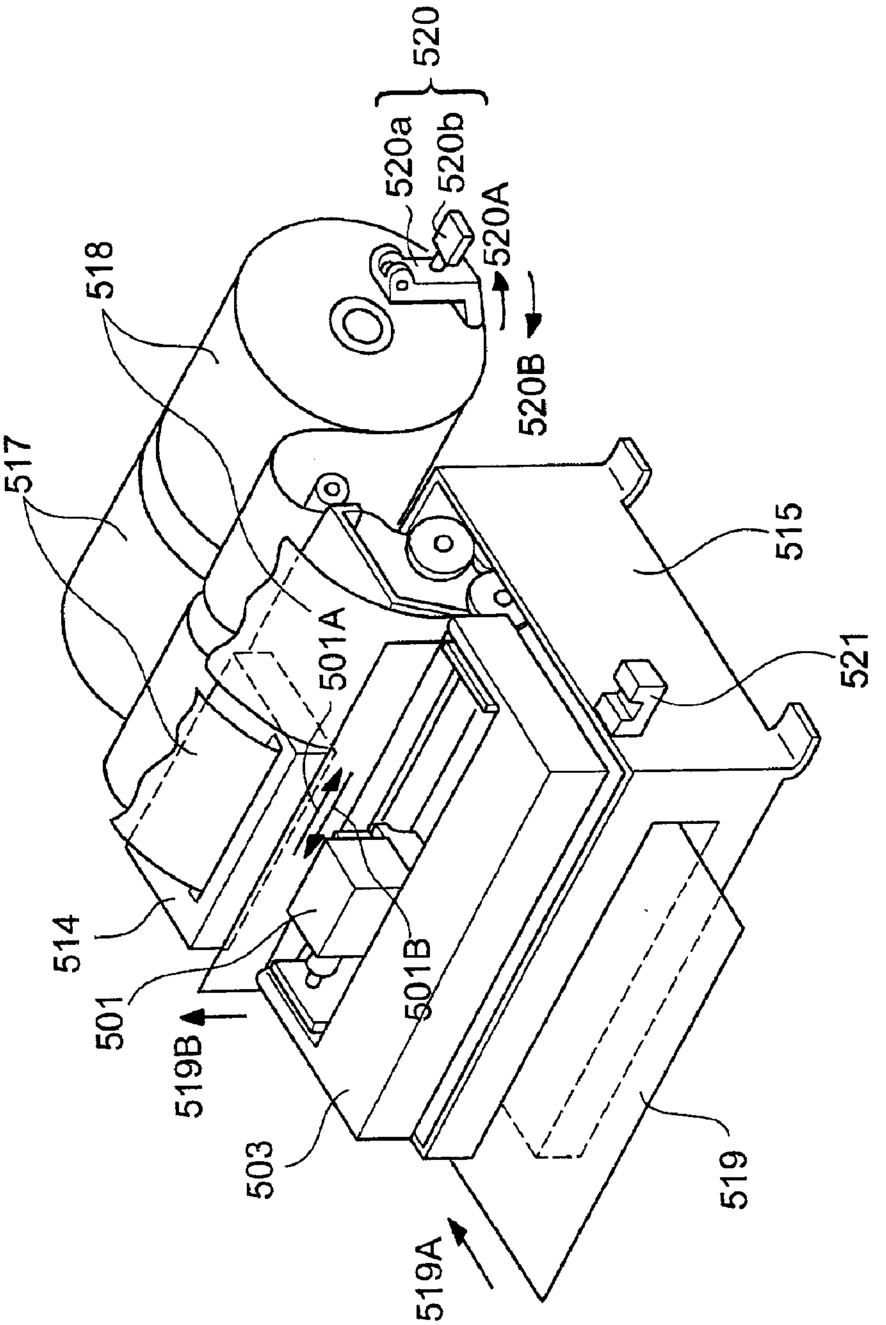
FIG. 11 is an overview of a printing apparatus used for describing a fourth embodiment of the invention.

FIG. 11 is an overview of a printing apparatus capable of printing on slip-, journal-, and receipt-type recording paper.

As shown in FIG. 11, this printing apparatus comprises printer head 501, which is typically a so-called "wire dot head" comprising plural wires arrayed in a vertical line; and ink ribbon 503. Printer head 501 prints while being driven in a reciprocal motion as indicated by arrows 501A and 501B.

Receipt paper 517 and journal paper 518 are inserted from the back of the printer mechanism in roll form, and are fed out from the top as shown in the figure. Slip paper 519 is inserted from the front of the printer mechanism (arrow 519A), and similarly fed out from the top (arrow 519A).

Near-end detector 520 for detecting the end of the receipt and journal paper is also provided. Near-end detector 520 comprises a near-end detecting lever 520*a*, which is pushed out in the direction of arrow 520A by the outside diameter of the roll paper, and a push switch 520*b*, which is turned on/off by near-end detecting lever 520*a*. The outside diameter steadily decreases as the end of the roll paper approaches, and when the core of the roll paper is reached, near-end detecting lever 520*a* rotates in the direction of arrow 520B. This causes push switch 520*b* to switch OFF, thus detecting the near-end of the paper.

After printing is completed, receipt paper 517 is cut by cutter unit 514, and can be handed to the customer.

The printing apparatus is covered by a housing not shown in the figures; this housing comprises a cover that is not shown and lower case 515. Cover detector 521 is an opposed-type photodetector, so called photo-interrupter. When the cover is closed, the beam from cover detector 521 is interrupted, and the cover can be detected to be closed.

Figure 12B:
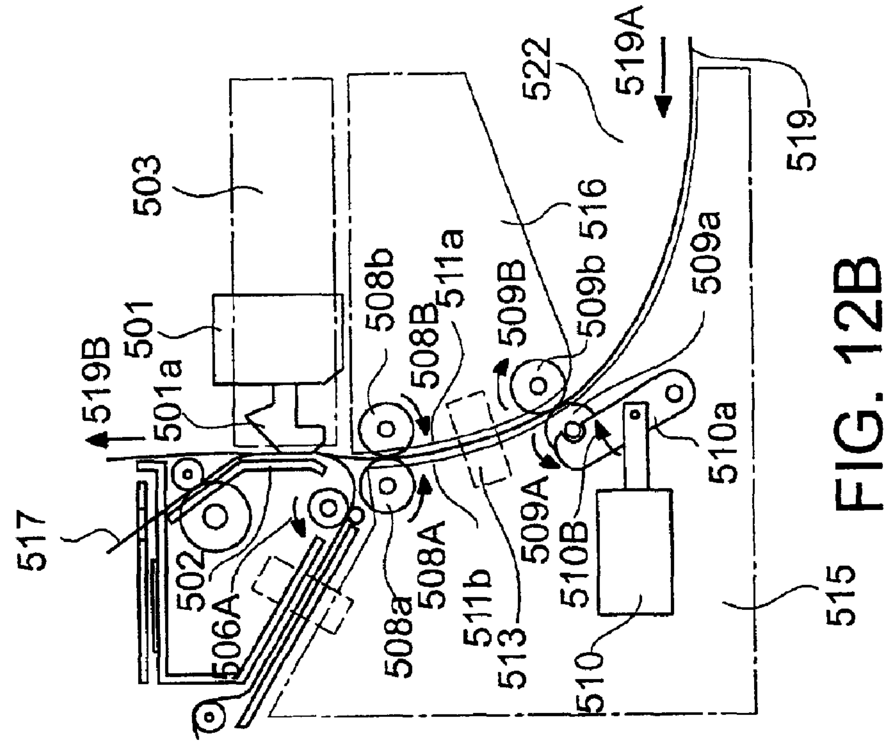
FIGS. 12A and 12B are cross-sectional views illustrating the operation of the printing apparatus of the present invention.
Figure 12A:
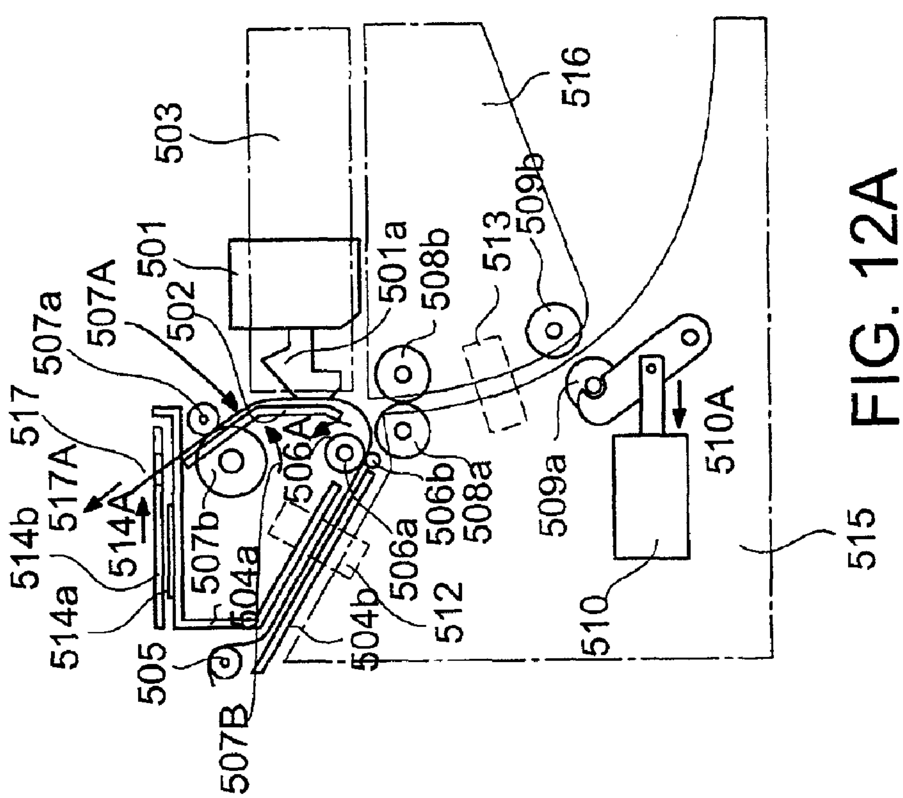

FIGS. 12A and 12B are cross-sectional views illustrating the operation of the printing apparatus of the present invention during printing to continuous and cut-sheet paper. FIG. 12A shows printing on continuous paper (receipt paper in the figure); FIG. 12B shows printing on cut-sheet paper (slip paper).

The wire pins (not shown in the figure) of printer head 501 are provided in wire holder 501*a* for printing through ink ribbon 503 to receipt paper 517 against platen 502.

Receipt paper 517 is fed by transport rollers 506*a* and 506*b* passed guide roller 505 and between paper guides 504*a* and 504*b*. The one transport roller 506*a* is connected to a motor or other drive power source (not shown in the figures).

Receipt paper detector 512 is a photo-interrupter, lever switch, or other detecting means positioned in the middle of paper guides 504*a* and 504*b;* receipt paper detector 512 is shown as a photo-interrupter in FIG. 12A.

When transported by transport rollers 506*a* and 506*b*, receipt paper 517 passes between ink ribbon 503 and platen 502, through presser rollers 507*a* and 507*b* and cutter unit 514, and is fed out from the top of the printing apparatus. Cutter unit 514 comprises cutter blade 514*a* and cutter cover 514*b;* cutter blade 514*a* is driven in the direction of arrow 514A by a motor or other drive power source to cut receipt paper 517.

It is to be noted that while receipt paper is shown in the figure, the mechanism used for journal paper is the same except for the cutter unit.

When slip paper is printed (FIG. 12B), slip paper 519 is inserted from slip paper insertion opening 522 at the front of the printing apparatus in the direction of arrow 519A. During roll paper printing, slip feed roller 509*a* is pulled in the direction of arrow 510A by plunger 510 as shown in FIG. 12A, and is thus separated from the opposing slip transport roller 509*b*. As a result, it is possible to insert slip paper 519. When slip paper 519 is inserted, slip paper 519 passes between slip paper guides 511*a* and 511*b* and abuts slip transport rollers 508*a* and 508*b*. Whether slip paper has been inserted is detected by slip paper detector 513. If paper has been inserted, plunger 510 is released and lever 510*a* moves in the direction of arrow 510B, thus causing slip paper 519 to be held between slip transport rollers 509*a* and 509*b*.

Slip transport rollers 508*b* and 509*b* are connected to a motor or other drive power source not shown in the figures, and slip paper 519 is transported as slip transport rollers 508*b* and 509*b* and the opposing slip transport rollers 508*a* and 509*a* rotate in the direction of arrows 508B, 508A, and 509B, 509A respectively. When printing is completed, slip paper 519 is fed out in the direction of arrow 519A, plunger 510 is driven to separate slip transport roller 509*a* from slip transport roller 509*b*, and the next slip paper form can be inserted.

Printing on slip paper 519 is possible with receipt paper 517 loaded as shown in the figure, and if carbon paper is added to slip paper 519, the same information can be simultaneously printed on both slip paper 519 and receipt paper 517.

Note that slip paper detector 513 is a photo-interrupter similar to receipt paper detector 512.

Also shown are lower case 515 and case 516 supporting the head assembly.

Figure 13:
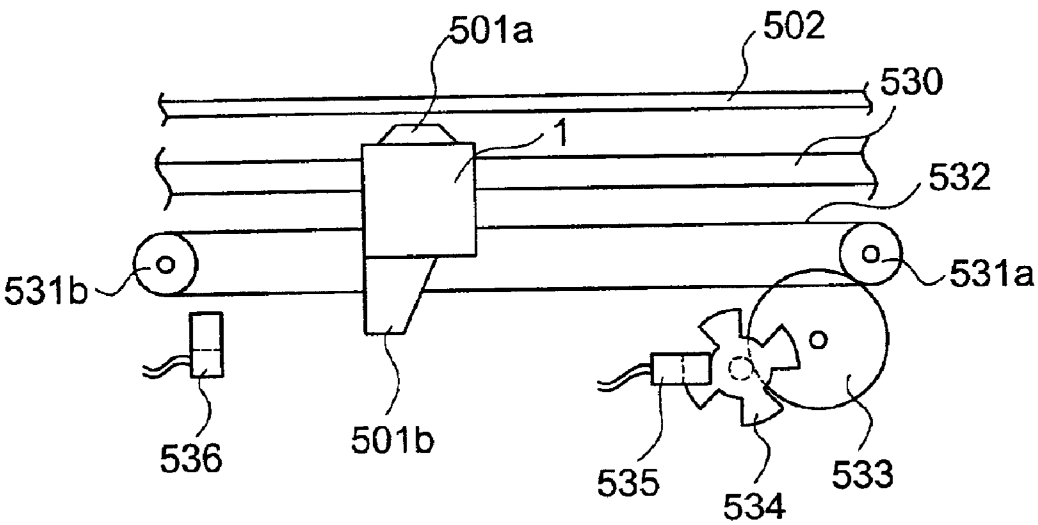
FIG. 13 is a cross-sectional review of the printing unit of the printing apparatus according to a preferred embodiment of the invention.

FIG. 13 is a cross-sectional view of the printing unit of the printing apparatus according to one embodiment of the invention.

The method of detecting a loss of synchronism in the head carriage drive motor is described with reference to FIG. 13.

Printer head 501 is fixed on head carriage 501*b* together with wire holder 501*a*. Head carriage 501*b* is driven reciprocally side to side by carriage transfer belt 532 and carriage drive gears 531*a* and 531*b;* carriage drive gear 531*a* is connected to a head carriage drive motor not shown in the figure. This motor is normally a pulse motor, and is a pulse motor in this embodiment. Carriage drive gear 531*a* drives rotating detector plate 534 via transfer gear 533. Rotating detector plate 534 is positioned so as to interrupt the detection beam of carriage detector 535, which is also a photo-interrupter. Carriage detector 535 detects the rotation of rotating detector plate 534 cause by the movement of head carriage 501*b*.

Note that rotating detector plate 534 is propeller-shaped, and when it rotates, the output of carriage detector 535 switches on/off on a regular period. More specifically, when head carriage 501*b* is driven reciprocally by the head carriage drive motor (not shown in the figure), the movement of head carriage 501*b* is detected by carriage detector 535.

If the receipt paper, journal paper, or slip paper between printer head 501 and platen 502 is wrinkled and caught between wire holder 501*a* and platen 502, a paper jam occurs. As a result, head carriage 501*b* no longer tracks rotation of the carriage drive motor, and the carriage drive motor loses synchronization. This loss of synchronization is detected by carriage detector 535, and indicated as a "carriage error."

A "home position" for printer head 501 is needed to determine a reference point for the print position. Home position detector 536 is also a photo-interrupter for detecting head carriage 501*b*. More specifically, when head carriage 501*b* moves to the left, the position at which the light beam from home position detector 536 is interrupted is the reference point for the home position.

When printer head 501 moves toward the home position, home position detector 536 can detect if printer head 501 does not reach the home position due to a paper jam or other factor. A home position error occurs when printer head 501 cannot be returned to the home position.

Figure 14:
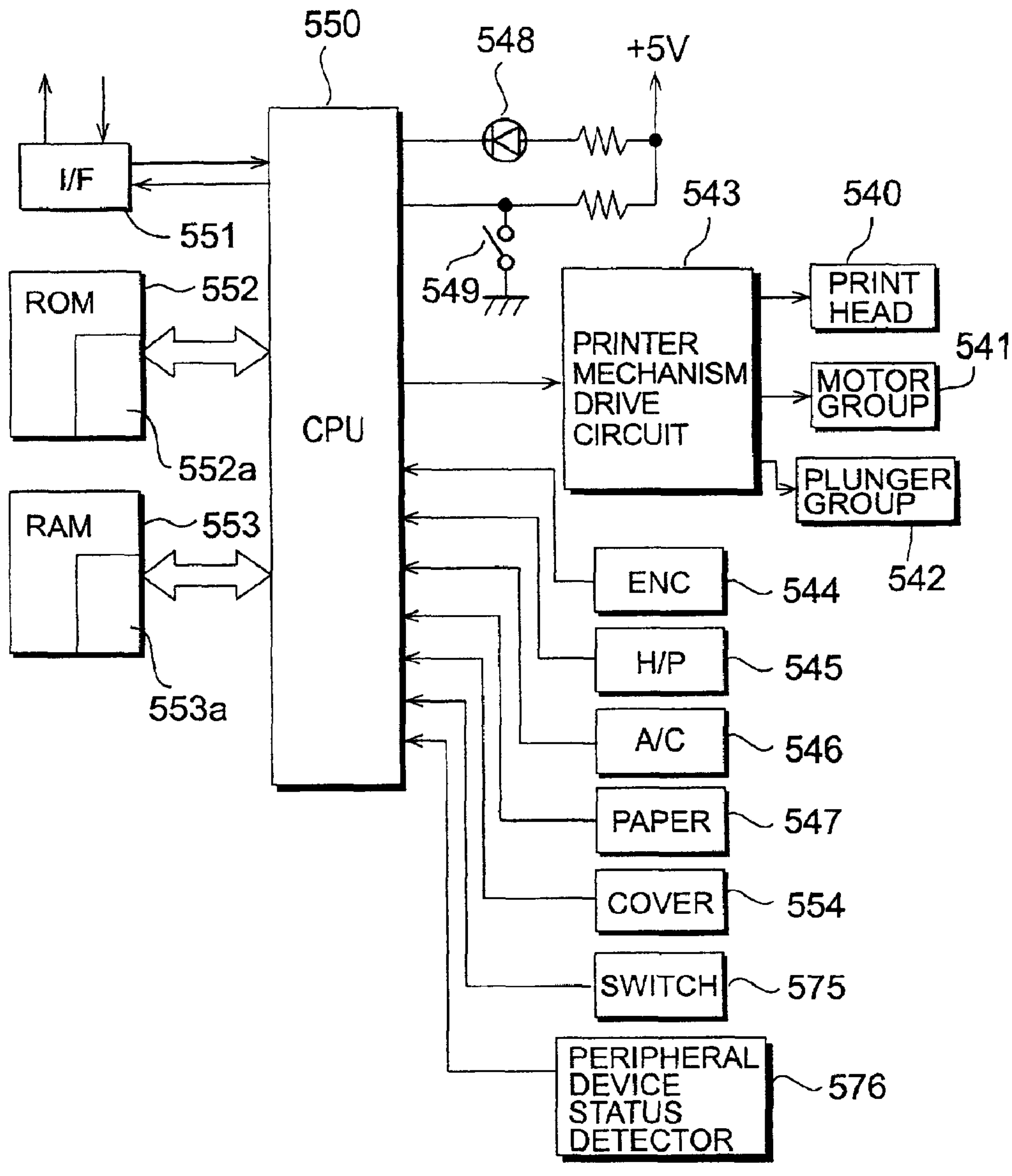
FIG. 14 is a block diagram of the control circuit achieving the present invention.

A circuit block diagram of the control circuit achieving the present invention is shown in FIG. 14.

The mechanism of the printing apparatus of the invention as described above is represented as print head 540, motor group 541, and plunger group 542 in FIG. 14; this printer mechanism is driven by printer mechanism drive circuit 543. The printer mechanism also comprises carriage detector 544, home position detector 545, automatic cutter detector 546, paper detectors 547, and cover detectors 554, each of which is connected to central processing unit (CPU) 550.

Automatic cutter detector 546 detects the position of cutter blade 514*a* (FIG. 12), drives the cutter blade drive motor (not shown in the figures), and generates the detector signal at a predetermined position. If a paper jam occurs in the cutter blades, the cutter blades will not move to the specified position, the detector signal will not be output, and an error is reported. This error is called a "cutter error."

Paper detectors 547 include near-end detector 520 (FIG. 11), and receipt paper detector 512 and slip paper detector 513 (FIG. 12).

Also connected to CPU 550, which controls the entire printing apparatus, are display device 548, typically an LED unit; panel switch 549 for manually advancing the paper; interface 551 for communications with the host computer; ROM 552 for storing the control program, print character patterns, and other static information; and RAM 553 providing the receiving buffer, print buffer, and other data buffers.

When print data is input from interface 551, the data is stored to the receiving buffer of RAM 553, and CPU 550 interprets the data, reads the character patterns corresponding to the data code from ROM 552, and drives print head 540, motor group 541, and plunger group 542 by means of printer mechanism drive control circuit 543 to print.

When a carriage error, home position error, cutter error, or other error occurs, CPU 550 can drive display device 548 to notify the user that an error has occurred.

Figure 15:
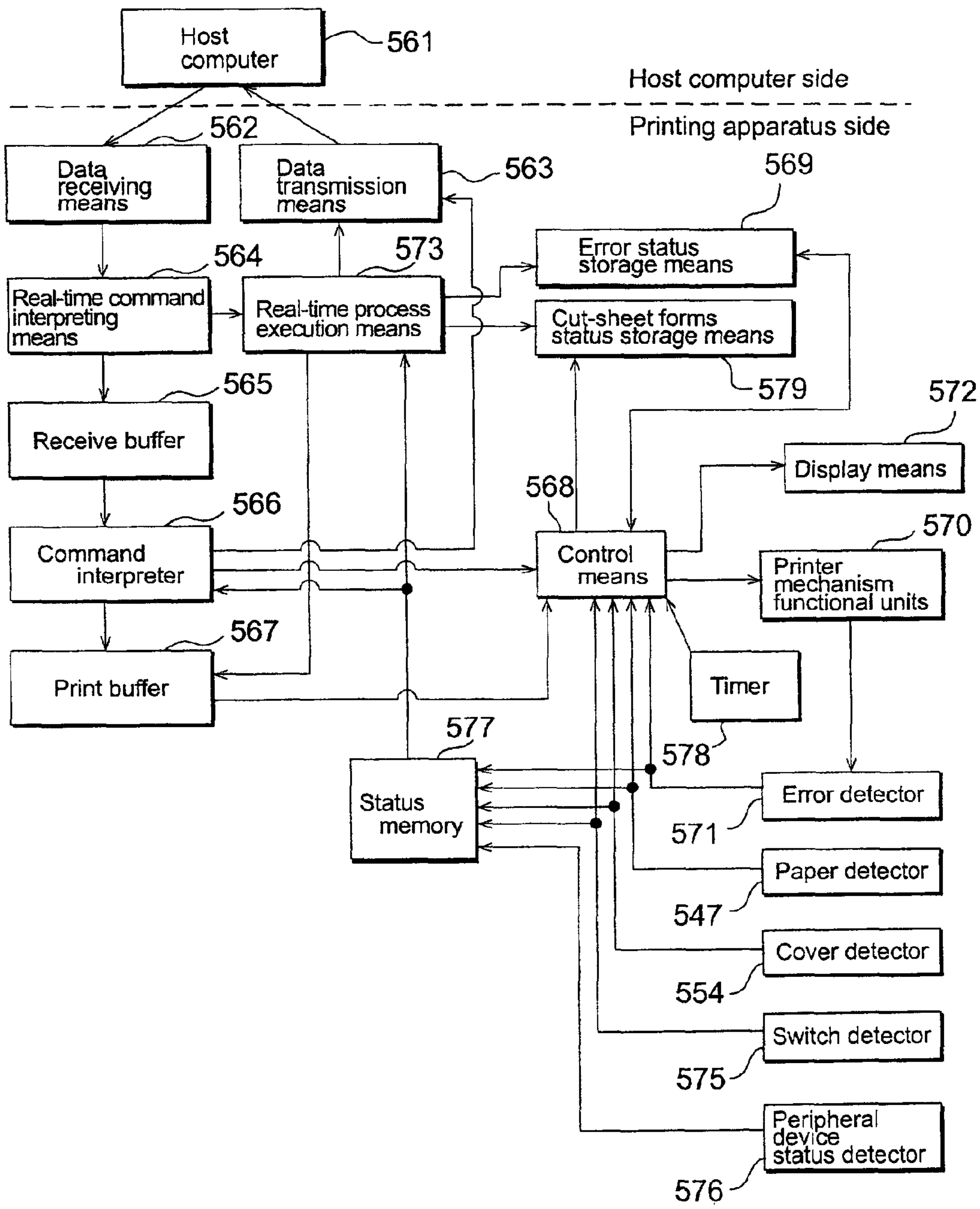
FIG. 15 is a functional block diagram used for describing the fourth embodiment of the invention.

FIG. 15 is a functional block diagram showing the overall mechanism of the invention, and the relationships between the various functional means.

Host computer 561 transmits the command data, print data, and other information to the printing apparatus. Data receiving means 562 receives the data codes from host computer 561 through interface 551, and is realized as an interrupt sequence activated by interface 551.

Real-time command interpreting means 564 interprets and executes the received data at the same time it is received, and the process is executed during the interrupt sequence together with data receiving means 562. Real-time command interpreting means 564 determines whether the received data is a real-time control command, and executes the specified process based on the command if the received data is determined to be a real-time control command.

Both real-time command interpreting means 564 and data receiving means 562 are realized by a microprocessor in the embodiment. The microprocessor functions are both real-time command interpreting means 564 and data receiving means 562 during the interrupt sequence. When the host system sends data to the printer, the interrupt sequence starts. The microprocessor receives the data in the former part of the interrupt sequence, and then it starts interpreting the data in the latter part of the sequence.

All received data passed through real-time command interpreting means 564 is stored temporarily in receiving buffer 565. The received data buffered to receiving buffer 565 is read one at a time by command interpreter 566, interpreted, and separated into print data and command data for controlling the printing apparatus. Command data is applied by control means 568 to execute the settings or operations corresponding to the command code. Print data is used to store the character patterns corresponding to the data codes to print buffer 567. When printing is then executed by control means 568, control means 568 reads the print pattern from print buffer 567, and controls printer mechanism functional units 570 to print.

The RS-232C two-way, serial interface is used as the interface in this embodiment because of its ability to maintain communications with the host computer even when the printing apparatus is off-line. With the standard RS-232C two-way, serial interface, the off-line status of off-line devices can be detected by other devices, but because several bytes of data may be loaded to the communication bus before data transmission can be stopped, it is necessary for the off-line device to receive this data even after it moves off-line. It is therefore necessary for the device to move off-line before the receiving buffer becomes full, thereby enabling data to be received and stored to the receiving buffer while the capacity remains even when an error occurs and the printing apparatus goes off-line. Data received after the receiving buffer becomes full, however, is thrown away.

With the fourth embodiment of the invention, however, received commands are interpreted by real-time command interpreting means 564, which is activated by a receive interrupt, before being stored in the receiving buffer. As a result, the command can be processed even if the transmitted data is not stored.

Real-time commands include commands requesting the status of the printing apparatus. When this printing apparatus status request is received, real-time command interpreting means 564 responds by sending the current printing apparatus status to host computer 561 through data transmission means 563. It remains possible to send the printing apparatus status even when an error occurs because data receiving means 562, data transmission means 563, and real-time command interpreting means 564 remain functional.

Ordinary POS and ECR systems include a cash drawer in which cash paid by customers and change is stored. In some applications of the printer of the embodiment, the cash drawer is placed under the printer. Thus, the printer is designed to connect to and drive the cash drawer in accordance with the command sent from a host device. The printer can also detect status of the cash drawer, namely open or closed state through peripheral device status detector 576.

When the received command is determined by command interpreter 566 to be a cut-sheet form selection command, control means 568 is notified. Control means 568 thus notifies display means 572 that a cut-sheet form was selected, displays a prompt that the printing apparatus is waiting for cut-sheet form insertion, and stores cut-sheet forms information in RAM 553 by means of cut-sheet forms status storage means 579 to indicate that a cut-sheet form was selected and that the cut-sheet form insertion wait-state was entered. When a cut-sheet form is selected, cut-sheet form detector 547 detects insertion of the cut-sheet form and notifies control means 568 when the form is inserted.

Control means 568 monitors the cut-sheet form wait-state information, and stops printing apparatus drive until either the cut-sheet form wait-state information is deleted or cut-sheet form insertion is detected. By control means 568 stopping printing apparatus operation, command interpreter 566 also stops without being able to activate control means 568, but real-time command interpreting means 564 continues to operate irrespective of the cut-sheet form wait-state.

Real-time commands include commands canceling the cut-sheet form wait-state. When this command is received, the cut-sheet form insertion wait-state information and cut-sheet form selection information stored to RAM 553 are deleted by real-time command interpreting means 564. When control means 568, which monitors the cut-sheet form insertion wait-state, recognizes that the cut-sheet form insertion wait-state information has been deleted, it cancels the cut-sheet form insertion wait-state, clears print buffer 567, and selects the default paper type. The cut-sheet form insertion wait-state can be canceled by a time-out, and control means 568 thus controls timer 578.

If a paper jam or other error occurs during printing, paper feeding, or paper cutting, an error is detected by error detector 571, control means 568 is notified, and the error information is stored to status memory 577. Control means 568 notifies display means 572 that an error has occurred, an error notice is displayed, and the error occurrence is stored as error information to RAM 553 by error status storage means 569.

Control means 568 monitors the error information, and stops operation of the printing apparatus until the error information is cleared. By control means 568 stopping printing apparatus operation, command interpreter 566 also stops without being able to activate control means 568, but real-time command interpreting means 564, which is activated by a receive interrupt from interface 551, continues to operate irrespective of the error. Because command interpreter 566 is stopped, however, the data received by interface 551 is simply stored to receiving buffer 565, and control means 568 therefore controls the interface to notify the host computer that the printing apparatus cannot accept anymore information (i.e., notifies the host computer that the printing apparatus is now off-line).

The real-time commands also include a ‘recover from error’ command. When this command is received, real-time command interpreting means 564 deletes the error information stored to RAM 553. When control means 568, which monitors this error status information, recognizes that the error information was deleted, it reactivates the printing apparatus to resume printing.

Another ‘recover from error’ command is a command to resume printing after deleting all previously received data. When this command is received, receiving buffer 565 and print buffer 567 are cleared by real-time command interpreting means 564, and the error information stored in RAM 553 is then deleted.

The printing apparatus also goes off-line when a no-paper state is detected by cut-sheet form detector 547, when an open-cover state is detected by cover detector 554, and when a manual form feed caused by the form feed switch is detected by switch detector 575. These states are stored to status memory 577, and the information is reported to host computer 561 by real-time command interpreting means 564.

Figure 16:
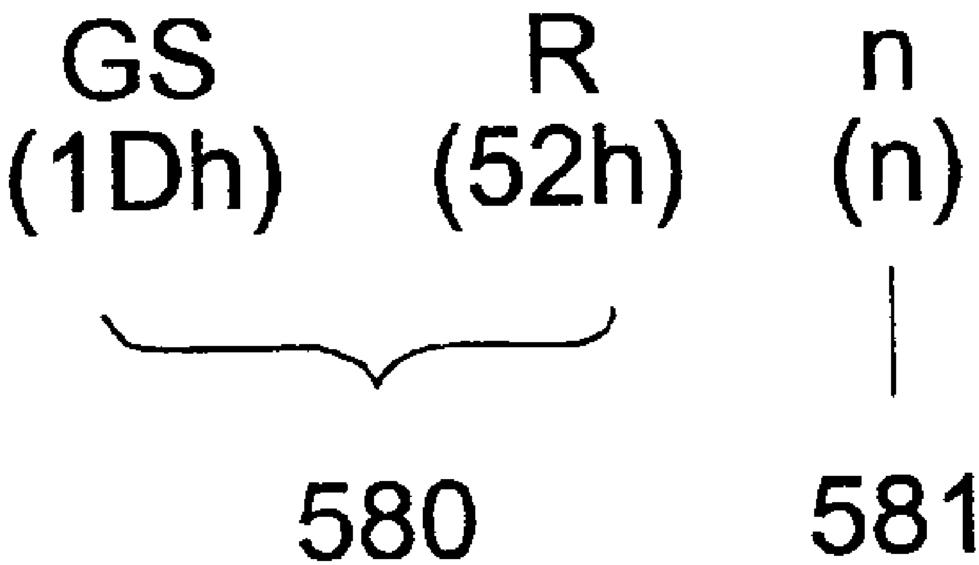
FIG. 16 is an example of the command used in the fourth embodiment of the invention.

FIG. 16 shows the command code for real-time commands in the present embodiment. Referring to FIG. 16, received data [GS], [R], and [n] are each one byte long, expressed as 1D, 552, and n in hexadecimal code. [GS] and [R] indicate a real-time command; what is executed is selected according to the value of [n].

The values of [n] and what is executed for each [n] value in this embodiment are shown in Table 1.

TABLE 1

| n | What is executed |
|---|---|
| 0 | Send printer status. |
| 1 | Send the cause of the off-line state. |
| 2 | Send the cause of the error. |
| 3 | Send the status of the continuous forms detector. |
| 4 | Send the status of the slip paper detector and slip paper. |
| 5 | Send the status of the validation paper detector and validation paper. |
| 6 | Cancel cut-sheet form insertion wait-state. |
| 7 | Recover from error (resume printing). |
| 8 | Recover from error (clear buffers). |

When [n]=0, the printing apparatus status byte (one byte) shown in Table 2 is the host computer.

TABLE 2 n = 0: printer status

| Bit | Function | Value 0 | Value 1 |
|---|---|---|---|
| 0 | Reserved | Fixed to 0 | |
| 1 | Reserved | Fixed to 1 | |
| 2 | Drawer kick connector | 0 | 1 |
| 3 | On-line/off-line status | on-line | off-line |
| 4 | Reserved | Fixed to 1 | |
| 5 | Undefined | | |
| 6 | Undefined | | |
| 7 | Reserved | Fixed to 0 | |

The drawer status, and printing apparatus on-line/off-line status can be determined by the host computer based on the printing apparatus status information. When the printing apparatus is off-line, more specific off-line information can be obtained by setting [n] to 1.

When [n]=1, the off-line information byte (one byte) shown in Table 3 is sent to the host computer.

TABLE 3 n = 1: off-line cause status

| Bit | Function | Value 0 | Value 1 |
|---|---|---|---|
| 0 | Reserved | Fixed to 0 | |
| 1 | Reserved | Fixed to 1 | |
| 2 | Cover status | Closed | Open |
| 3 | Form feed by form feed switch | Form feed not in progress | Form feed in progress |
| 4 | Reserved | Fixed to 1 | |
| 5 | No paper: printing stopped | Printing not stopped | Printing stopped |
| 6 | Error status | No error | Error generated |
| 7 | Reserved | Fixed to 0 | |

The host computer can thus evaluate the off-line information, and can post prompts or other appropriate information to the user based on the evaluation result. If an error is determined to have occurred, detailed error information can be obtained by resetting [n] to 2.

When [n]=2, the error information byte (one byte) shown in Table 4 is sent to the host computer.

TABLE 4 n = 2: error cause status

| Bit | Function | Value 0 | Value 1 |
|---|---|---|---|
| 0 | Reserved | Fixed to 0 | |
| 1 | Reserved | Fixed to 1 | |
| 2 | Mechanical error | No error | Error generated |
| 3 | Automatic paper cutter error | No error | Error generated |
| 4 | Reserved | Fixed to 1 | |
| 5 | Non-recoverable error | No error | Error generated |
| 6 | Auto-recover error | No error | Error generated |
| 7 | Reserved | Fixed to 0 | |

The mechanical errors shown in Table 4 refer primarily to errors due to a paper jam, but also include carriage errors and home position errors. These are further distinguished as paper jams around the printer head, and automatic paper cutter errors, thereby enabling the host computer to distinguish between paper jams occurring around the printer head, and in the automatic paper cutter. Based on this determination, the user is appropriately notified using the display means of the host computer where the error occurred, thus facilitating removal of the paper jam.

Printing can be resumed when paper jam errors and similar errors occur by removing the paper jam or other error cause. Errors can also occur as a result of external power supply problems, damage to the printer head temperature detector, and other causes making resumption of printing difficult, and it is necessary to distinguish these non-recoverable errors from recoverable errors (from which printing can be resumed). Errors other than paper jam errors are therefore identified as non-recoverable errors by setting bit 5.

When [n]=3, the continuous paper (incl. journal and receipt paper) detector information byte (one byte) shown in Table 5 is sent to the host computer.

TABLE 5 n = 3: continuous paper detector status

| Bit | Function | Value 0 | Value 1 |
|---|---|---|---|
| 0 | Reserved | Fixed to 0 | |
| 1 | Reserved | Fixed to 1 | |
| 2 | Journal near-end detector | Paper loaded | No paper |
| 3 | Receipt near-end detector | Paper loaded | No paper |
| 4 | Reserved | Fixed to 1 | |
| 5 | Journal end detector | Paper loaded | No paper |
| 6 | Receipt end detector | Paper loaded | No paper |
| 7 | Reserved | Fixed to 0 | |

When [n]=4, the slip paper detector information byte (one byte) shown in Table 6 is sent to the host computer.

TABLE 6 n = 4: slip status

| Bit | Function | Value 0 | Value 1 |
|---|---|---|---|
| 0 | Reserved | Fixed to 0 | |
| 1 | Reserved | Fixed to 1 | |
| 2 | Slip paper selection | Selected | Not selected |
| 3 | Slip paper insertion wait-state | Waiting | Not waiting |
| 4 | Reserved | Fixed to 1 | |
| 5 | Slip paper detector | Paper loaded | No paper |
| 6 | | | |
| 7 | Reserved | Fixed to 0 | |

It is possible to determine from this slip status byte shown in Table 6 whether slip paper is selected or whether continuous or validation paper is selected. It is also possible to determine when slip paper is selected whether the printing apparatus is waiting for slip paper insertion, or whether the paper has already been loaded and printing can proceed.

When [n]=5, the validation paper detector information byte (one byte) shown in Table 7 is sent to the host computer.

TABLE 7 n = 5: validation status

| Bit | Function | Value 0 | Value 1 |
|---|---|---|---|
| 0 | Reserved | Fixed to 0 | |
| 1 | Reserved | Fixed to 1 | |
| 2 | Validation paper selection | Selected | Not selected |
| 3 | Validation paper insertion wait-state | Waiting | Not waiting |
| 4 | Reserved | Fixed to 1 | |
| 5 | Validation paper detector | Paper loaded | No paper |
| 6 | | | |
| 7 | Reserved | Fixed to 0 | |

It is possible to determine from this validation status byte shown in Table 7 whether validation paper is selected or whether continuous or slip paper is selected. It is also possible to determine when validation paper is selected whether the printing apparatus is waiting for validation paper insertion, or whether the paper has already been loaded and printing can proceed.

The real-time command data receiving means and real-time command interpreting means are described below with reference to FIGS. 7 and 8.

Figure 17:
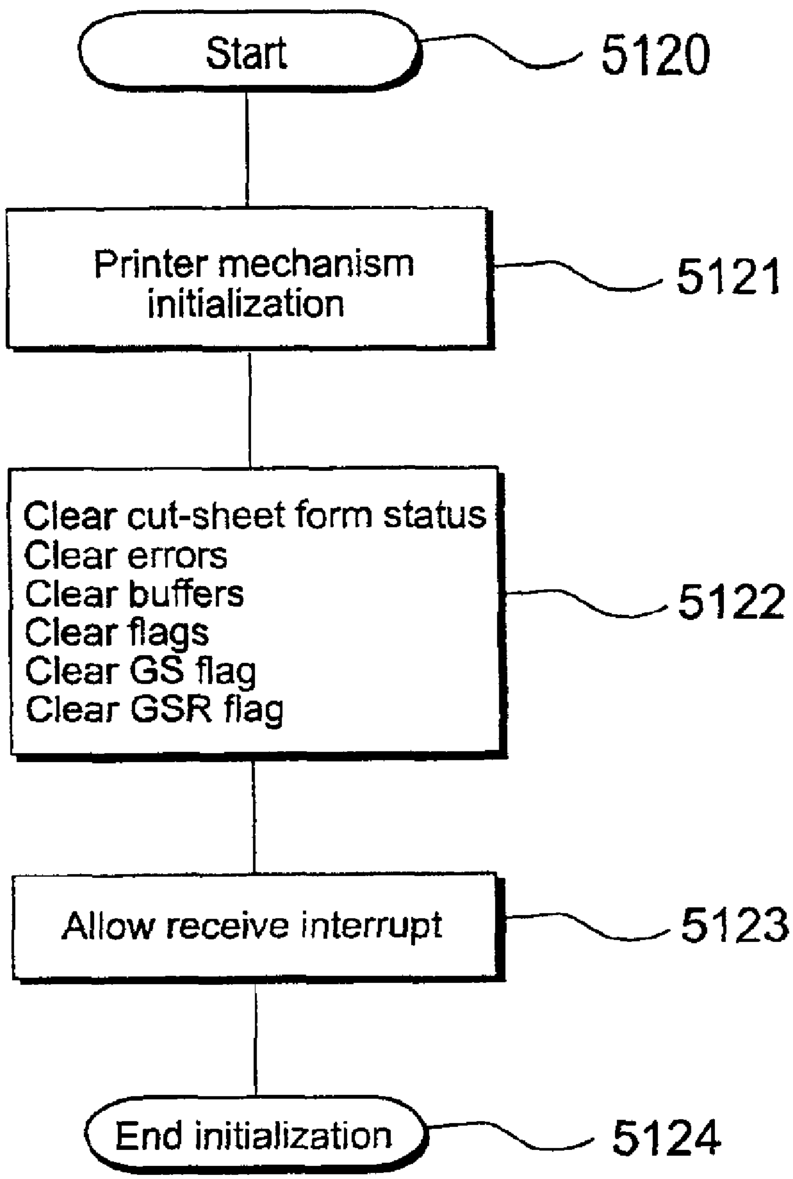
FIG. 17 is a flow chart of a control method applied by the printing apparatus according to the fourth embodiment of the invention.

FIG. 17 shows the printing apparatus initialization process, which starts immediately after the power is turned on (step 5120). During this initialization, the printing mechanism is initialized (step 5121), and all information in RAM 553 is initialized, including the cut-sheet form status flag, error information, clear-buffer flag, GS flag, and GSR flag (step 5122). The clear-buffer flag, GS flag, and GSR flag are used in the receive interrupt process, and are used by the real-time command interpreting means. The real-time command interpreting means is included in the receive interrupt process caused by the data transfer requirement of the host device. The clear buffers flag is set by the real-time command interpreting means and checked by the received data cancellation means. The other flags, namely the GS and GSR flags, are used only in the interrupt process to change the operation state of the real-time command interpreting means. Since real-time commands are composed of 3 bytes and the receive interrupt process is caused by each byte reception, the real-time interpreting means must change its state in accordance with the received data. In the final step 5124, interface receive interrupts are enabled, and the initialization process is ended (step 5124).

Figure 18:
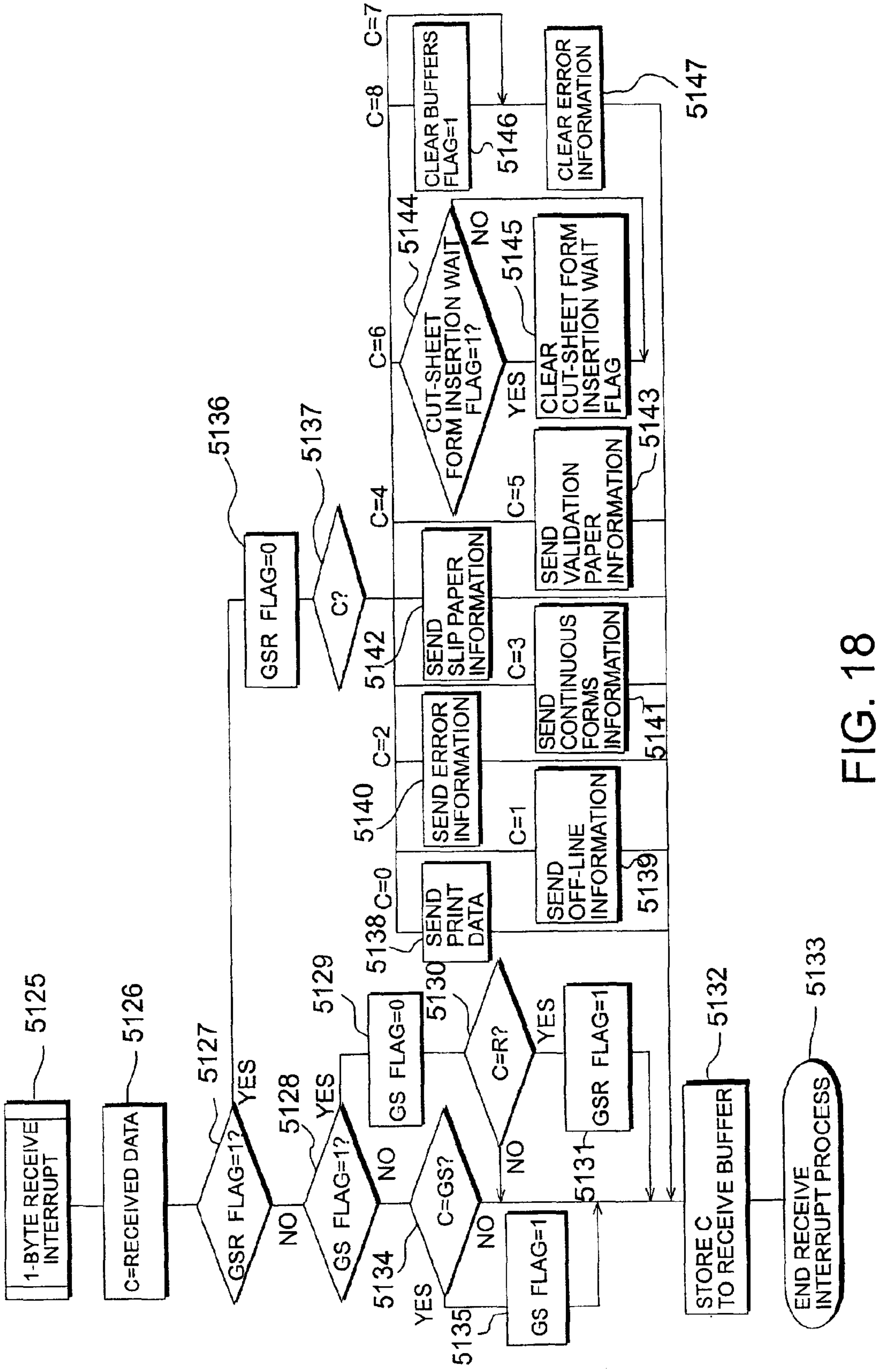
FIG. 18 is a flow chart of a control method applied by the printing apparatus according to a the fourth embodiment of the invention.

FIG. 18 shows the interface receives interrupt process, as well as the data receiving means and the real-time command interpreting means. The data received from the host computer through the interface is received one byte at a time, and the process shown in FIG. 18 is executed for every byte received. Because the real-time commands comprise three bytes, [GS], [R], and [n], as shown in FIG. 16, the real-time command is controlled by the GS flag, which is set when the [GS] byte is received; the GSR flag, which is set when the [R] byte is received when the GS flag is set; and the [n] byte received when the GSR flag is set. There is also a clear-buffer flag, which stores whether the buffer is cleared according to the value of [n].

Data is received and the receive interrupt is activated at step 5125. At step 5126, the received data is read from the interface, and at step 5127 it is determined whether the GSR flag is set. If the GSR flag is set, i.e., if the [GS] and [R] bytes have already been received, the received data ("C" in this example) is processed with the value of [n]. The GSR flag is cleared at step 5136, and the following operation is executed based on the value of the received data (C) (step 5137).

If C=0, the printer information stored in RAM 553 is sent through the interface to the host computer by data transmission means 563 (step 5138).

If C=1, the off-line information stored in RAM 553 is sent through the interface to the host computer by data transmission means 563 (step 5139).

If C=2, the error information stored in RAM 553 is sent through the interface to the host computer by data transmission means 563 (step 5140).

If C=3, the continuous paper information stored in RAM 553 is sent through the interface to the host computer by data transmission means 563 (step 5141).

If C=4, the slip information stored in RAM 553 is sent through the interface to the host computer by data transmission means 563 (step 5142).

If C=5, the validation information stored in RAM 553 is sent through the interface to the host computer by data transmission means 563 (step 5143).

Figure 19:
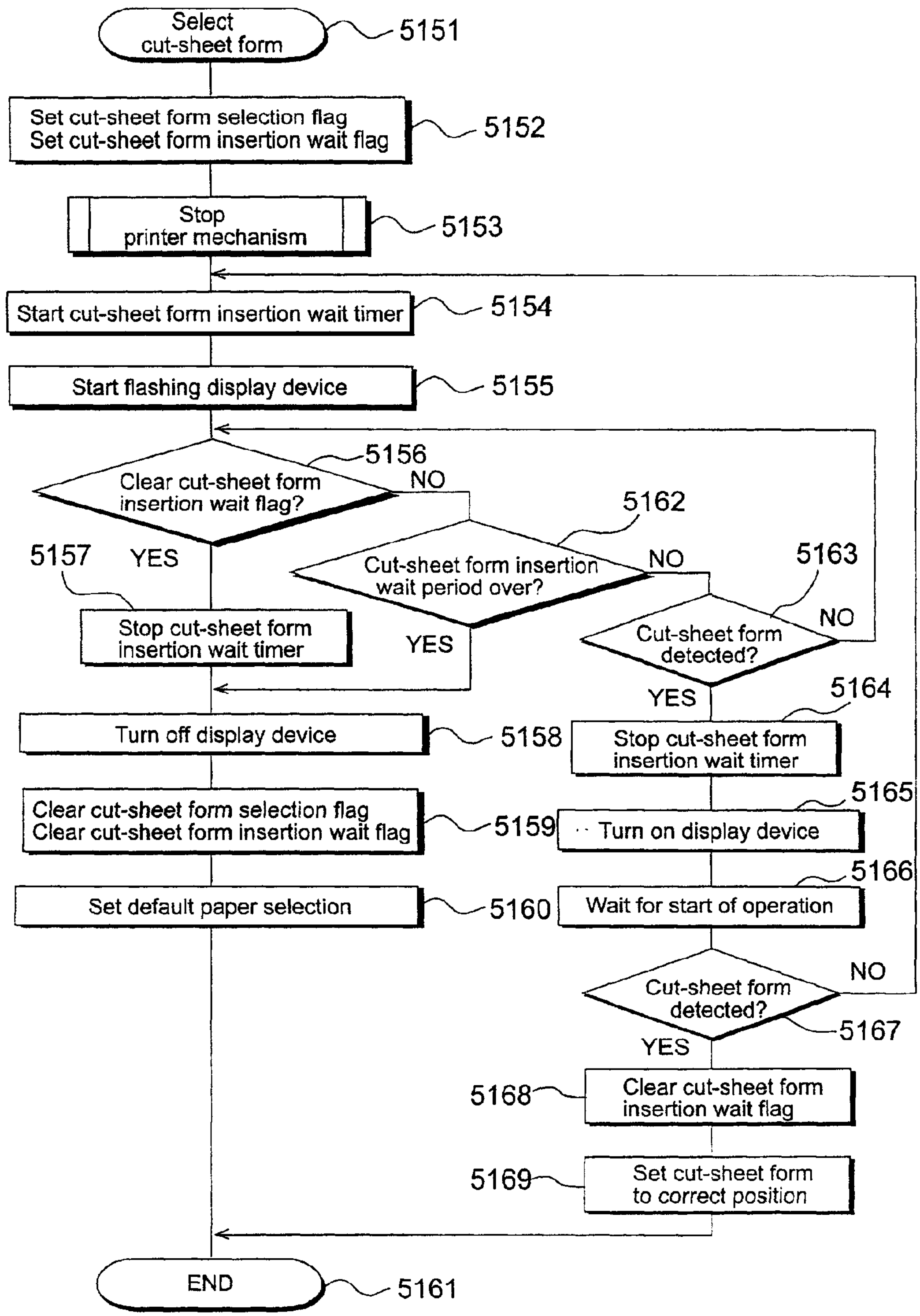
FIG. 19 is a flow chart of a control method applied by the printing apparatus according to the fourth embodiment of the invention.

If C=6, it is determined whether the cut-sheet form insertion wait-state is set (step 5144), and if so, the cut-sheet form wait flag is cleared (step 5145). As shown in FIG. 19, the system can recover from the cut-sheet form insertion wait-state by clearing the cut-sheet form wait flag.

Figure 20:
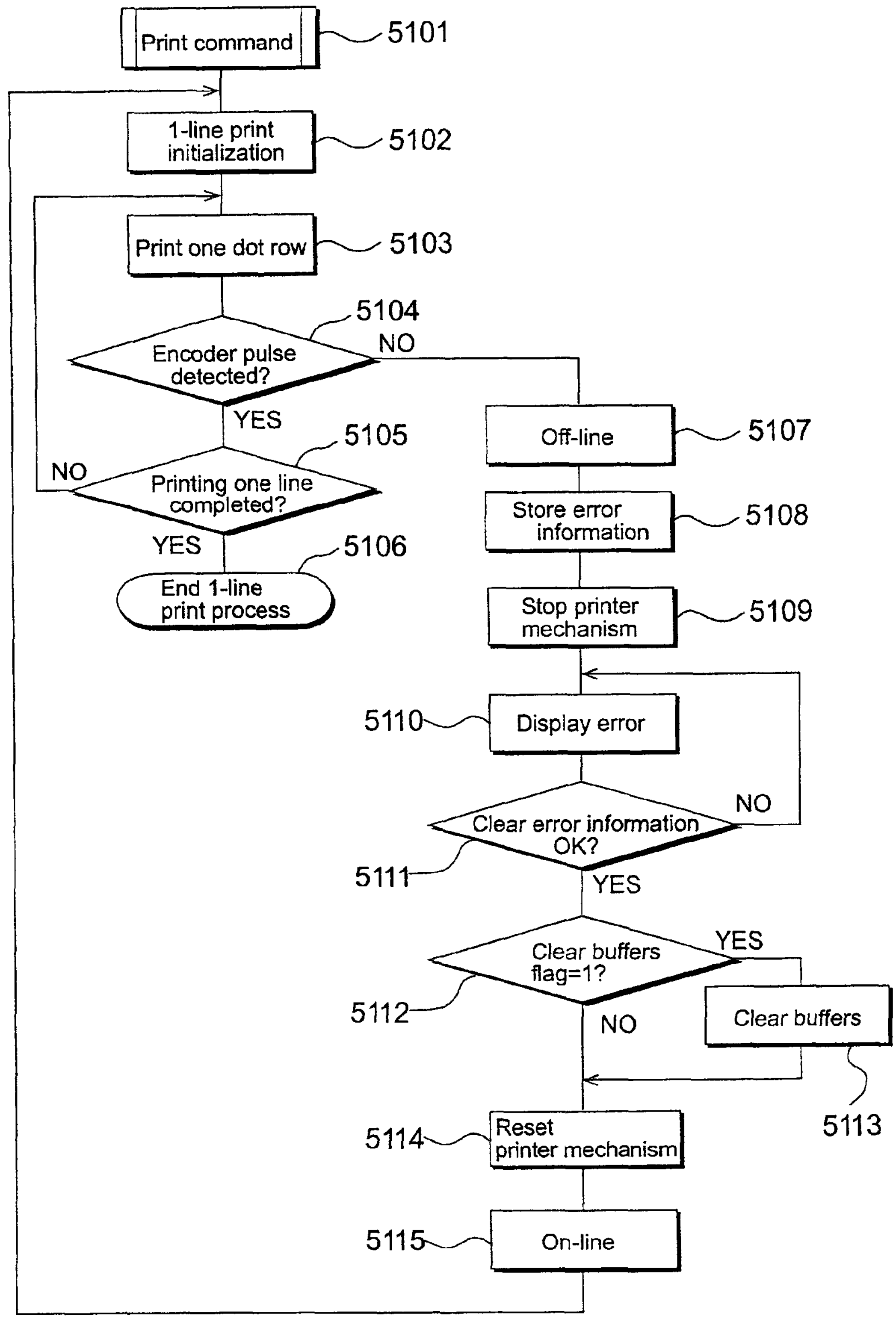
FIG. 20 is a flow chart of a control method applied by the printing apparatus according to the fourth embodiment of the invention.

If C=8, the clear-buffer flag is set (step 5146), and the error information in RAM 553 is cleared (step 5147). When the clear-buffer flag is cleared, the receiving buffer and print buffer are both cleared as shown in FIG. 20 after error recovery. If C=7, the error information is simply cleared (step 5147).

The received data is also temporarily stored in the receiving buffer even if the data is a real-time command (step 5132).

If the GSR flag is cleared in step 5127, it is determined in step 5128 whether the GS flag is set. Specifically, if the data has been received through the [GS] byte, the GS flag is set; the GS flag is therefore cleared in step 5129, and it is determined whether the received data (C) is the [R] byte (step 5129). When the data received immediately before this data is [GS] byte, the [GS] flag has been set in step 5135 in the previous receive interrupt process. In other words, the [GS] flag indicates that the data received immediately before this data is [GS] byte. If C=[R], the GSR flag is set (step 5131), and the received data is stored to the receiving buffer (step 5132).

If the GS flag is cleared in step 5128, it is determined in step 5134 whether the received data (C) is the [GS] code. If C=[GS], the GS flag is set; if not, the data is stored directly to the receiving buffer (step 5132), and the receive interrupt process is ended (step 5133).

The operation of the control means for setting cut-sheet forms is described next with reference to FIG. 19. Shown in FIG. 19 are the process from selection of cut-sheet form printing to loading the paper, and the process for canceling the cut-sheet form print mode selection.

This process starts (step 5151) when command interpreter 566 determines that the input command is the cut-sheet form selection command, thus causing command interpreter 566 to set the cut-sheet form selection flag, and the cut-sheet form insertion wait flag (step 5152). After confirming that mechanical operations are stopped (step 5153), cut-sheet form insertion wait timer 578 is activated, and display device 548 is set flashing by display means 572 (step 5155). In step 5156 it is determined whether the cut-sheet form insertion wait flag is cleared; if so, i.e., if the cut-sheet form insertion wait-state is canceled by real-time command [GS] [R] [6], the cut-sheet form insertion wait timer 578 is stopped (step 5157), and display device 548 is turned off by display means 572 (step 5158). The cut-sheet form selection flag and cut-sheet form insertion wait flag are then cleared (step 5159), the paper corresponding to the default paper type setting is set (step 5160), and the cut-sheet form selection process is ended (step 5161).

If the cut-sheet form insertion wait flag is not cleared in step 5156, it is determined if the cut-sheet form insertion wait period has passed (step 5162); if the cut-sheet form insertion wait period has passed, the procedure skips forward to step 5158.

If the cut-sheet form insertion wait period has not passed in step 5162, it is determined in step 5163 whether the cut-sheet form is inserted. If the cut-sheet form is not inserted, the procedure loops back to step 5156 to determine again whether the cut-sheet form insertion wait flag is cleared. The procedure then determines again whether the cut-sheet form insertion wait flag is cleared, whether the cut-sheet form insertion wait period has passed, and whether the cut-sheet form is inserted.

If it is determined in step 5163 that the cut-sheet form was inserted, the cut-sheet form insertion wait timer 578 is stopped (step 5164), display device 548 is turned on (step 5165), and the start-operation standby period is waited (step 5166). If it is determined in step 5167 that the cut-sheet form is not inserted, the procedure loops back to step 5154, and the above operation is repeated.

If it is determined in step 5167 that the cut-sheet form is loaded, the cut-sheet form insertion wait flag is cleared (step 5168), the cut-sheet form is set to the correct position (step 5169), and the cut-sheet form selection process ends (step 5161).

As described hereinabove, by providing a data receive means and a real-time command interpreting means in the receive interrupt process, it is possible to interpret commands and cancel the cut-sheet form wait-state even when the printing apparatus is stopped due to a cut-sheet form insertion wait-state.

A means of detecting carriage errors is described below as an embodiment of the invention for detecting errors with reference to FIG. 20.

The process is started in step 5101 by the print command, and the printing apparatus is initialized for one line in step 5102. The line is then printed from steps 5103 to 5105. In step 5103, one dot row is printed and the printer carriage is advanced one dot row. In step 5104, it is determined whether a detector pulse was output from carriage detector 535 due to carriage movement; the detector pulse is usually output on a regular cycle if the carriage advances normally. In step 5105, it is determined whether printing the one line is completed; if not, the procedure loops back to step 5103. If the one row is completed, the procedure then ends at step 5106.

If the carriage is stopped at this time due to, for example, a paper jam, the detector pulse is not detected at step 5104, and the procedure branches to step 5107. The procedure from step 5107 is the process executed when a carriage error occurs, and the first step (step 5107) is to notify the host computer that the printing apparatus cannot receive further communication data, i.e., that it is off-line. That a carriage error has occurred is then stored to RAM 553 in step 5108. Because a carriage error is a recoverable error, the error is stored as a recoverable error. The printer mechanism is also stopped in step 5109.

That an error occurred is then displayed (step 5110) by the error display device until it is determined in step 5111 that the error information has been deleted. If a real-time command is received, the error information is deleted, and it is determined in step 5112 whether the received command indicates a clear buffer operation. If a clear buffer command has been received, the buffer is cleared in step 5113; the buffers cleared at this time are both the receiving buffer and print buffer. According to FIG. 18, one of the real-time commands whose code is described as [GS[ R] [7] causes the error state flag resetting means to clear the error information without clearing buffers, and another real-time command of [GS] [R] [8] causes the error state flag resetting means to do the same thing and the received data cancellation means to clear buffers.

A printer mechanism reset operation is then executed in step 5114, and the host computer is notified in step 5115 that the printing apparatus can again receive data, i.e., is again on-line.

By thus including a data receive means and real-time command interpreting means within the receive interrupt process, it is possible to continue interpreting commands when the printing apparatus stops due to an error, and recovery from errors is therefore also possible.

Control of the printing apparatus as seen from the host computer is described next.

Figure 21:
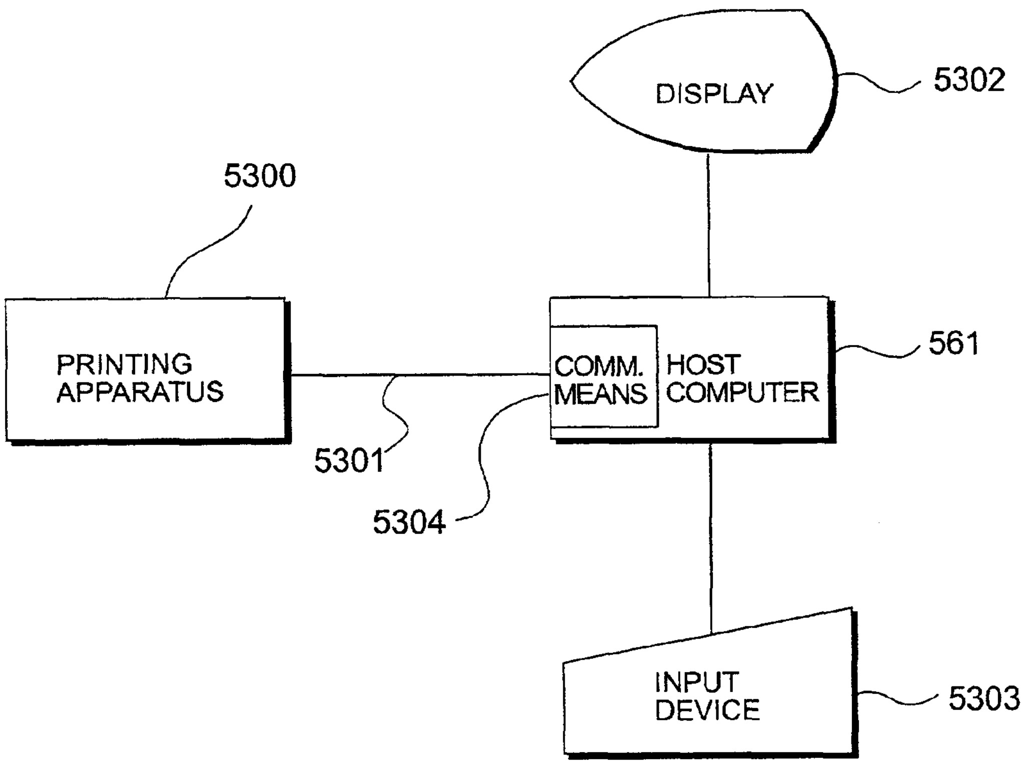
FIG. 21 a conceptual diagram of the data processing apparatus of the invention.

FIG. 21 is a conceptual diagram of the data processing apparatus of the invention in which printing apparatus 5300 is connected with host computer 561 by means of an RS-232C communication cable 5301. Host computer 561 comprises an internal communication means 5304 and an RS-232C interface control circuit. A CRT or other display device 5302, and keyboard or other input device 5303 are also connected to host computer 561.

Figure 22:
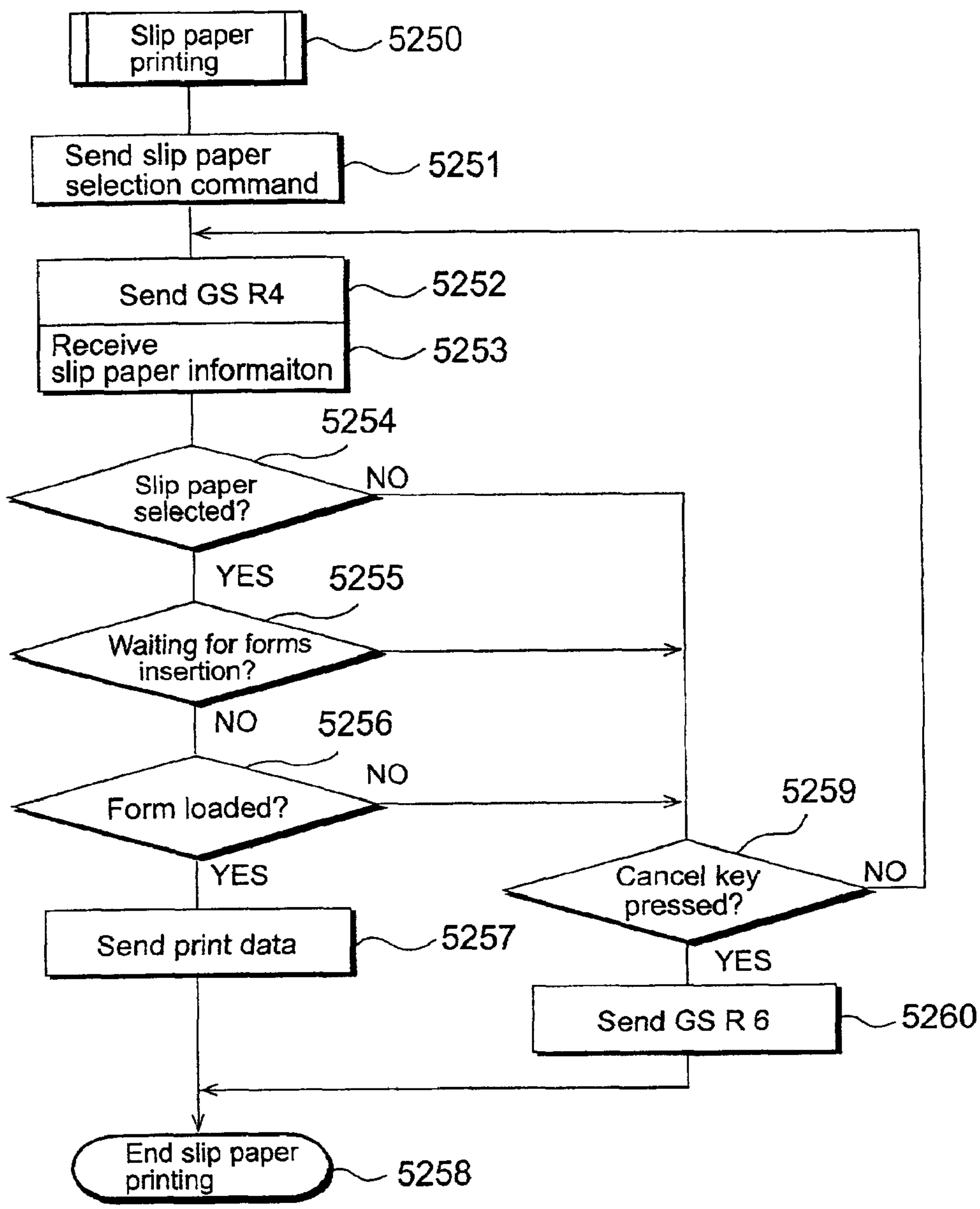
FIG. 22 is a flow chart of a control method applied by a host computer using a printing apparatus according to a preferred embodiment of the invention.

FIG. 22 is a flow chart of the control process of the host computer allowing cancellation of the cut-sheet form wait-state. Printing to slip paper is used as an example of cut-sheet form printing in FIG. 22.

When slip paper printing is selected (step 5250), the slip paper selection command is output (step 5251). Real-time command [GS] [R] [4] is then sent to determine the slip paper status (step 5252), and the corresponding response is received (step 5253). This response contains the information shown in Table 6. Based on this information, the host computer determines whether slip paper was selected (step 5254).

If slip paper was selected, it is determined based on the information from step 5253 whether the printing apparatus is waiting for slip paper insertion (step 5255). If it is not waiting, it is first determined whether the slip paper is loaded (step 5256); if so, the print data is output (step 5257), and slip paper printing is completed (step 5258).

If step 5255 returns that the printing apparatus is waiting slip paper insertion, the host computer monitors a specific key in input device 5303, e.g., a "cancel slip paper" key, and determines whether this key is pressed (step 5259). This key is specifically assigned the "cancel slip paper wait-state" function, and is operated by the user.

If the key is pressed, the "cancel slip paper wait-state" command [GS][R][6] can be output to cancel the slip paper wait-state (step 5260).

It is also possible to terminate slip paper printing (step 5259) by monitoring this key when slip paper is not selected (step 5254) and when there is no paper (step 5256). In these cases, sending the "cancel slip paper wait-state" command [GS][R][6] (step 5260) will be ignored because the printing apparatus is not in the cut-sheet form insertion wait-state. If the key is not pressed, the process loops back to step 5252, and the host computer waits for slip paper selection (step 5254) or until the slip paper is loaded (step 5256). In step 5254, the host system confirms that the slip mode is selected after sending the slip selection command in step 5251, because the command may be stored in the command buffer and may not have been executed yet. Even if the slip mode has not been selected, the slip printing can be canceled by sending GS R6 command to the printer of the embodiment. In that case, the printer will delete the slip selection command in the command buffer. In step 5256, print paper presence is checked only for confirmation. Usually, print paper absence can hardly be detected in step 5256 because the slip wait-state has been judged as false in step 5255 indicating that the print paper has once been detected before the step. The slip absence condition can occur if the slip paper is pulled out after being inserted once.

Figure 23:
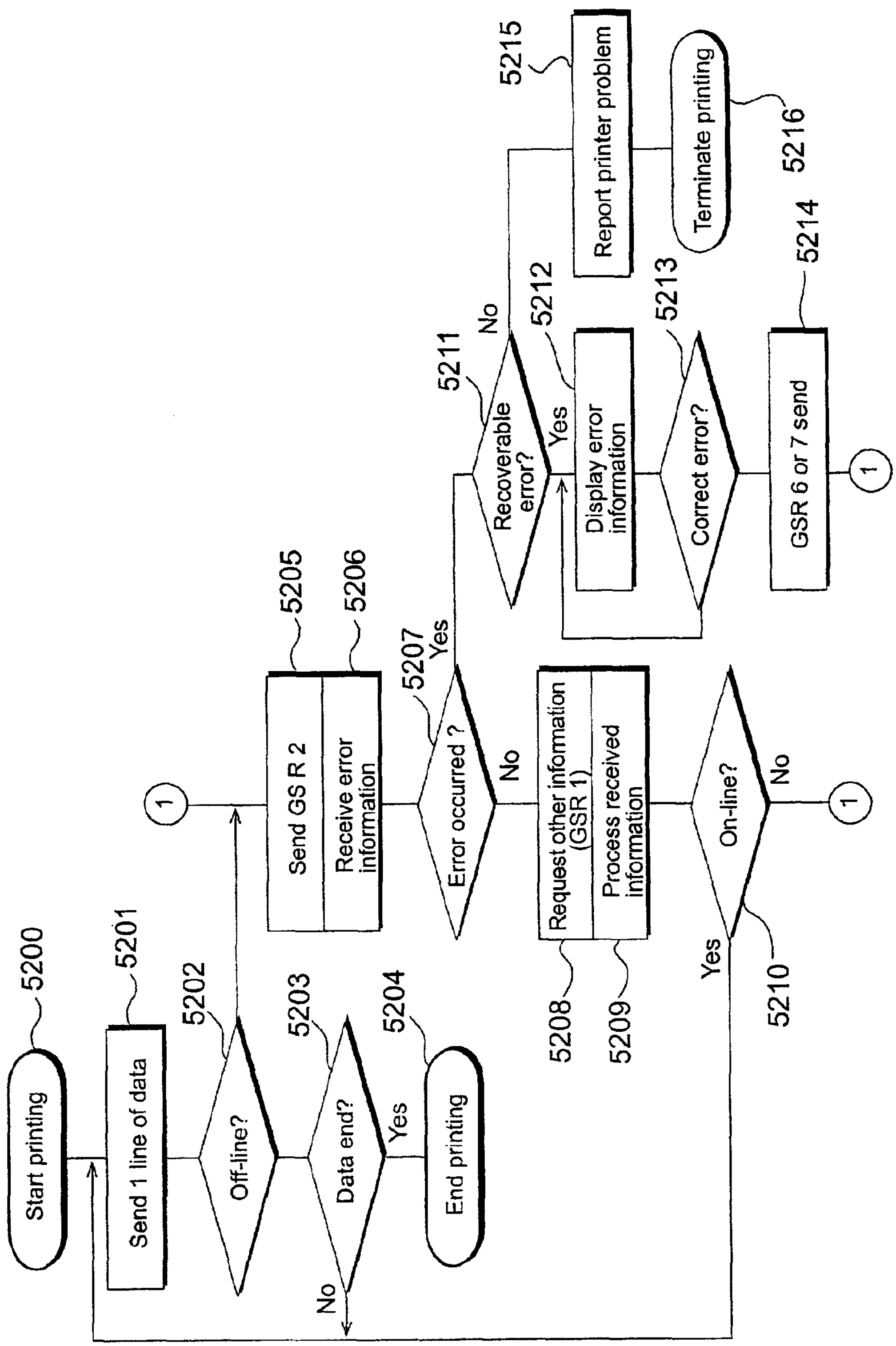
FIG. 23 is a flow chart of a control method applied by a host computer using a printing apparatus according to the fourth embodiment of the invention.

FIG. 23 is a flow chart of the printing process in the host computer allowing for error recovery.

After printing starts (step 5200), the host computer checks whether the printing apparatus is still on-line (step 5202) after each line of print data is sent to the printing apparatus (step 5201). In general, it is possible to determine with the RS-232C interface whether the receiving side (the printing apparatus in this case) is on-line from the CTS (Clear To Send) signal, the DSR (Data Set Ready) signal, or the XOFF code. If the printing apparatus is on-line, the host computer continues to send the print data. If there is no more print data (step 5203), printing ends (step 5204).

If in step 5202 the printing apparatus is off-line, it is possible that an error has occurred in the printing apparatus, or that printing has been disabled by some other factor (e.g., there is no more printing paper). To determine whether an error has occurred, the host computer sends real-time command [GS] [R] [2] in step 5205. The response to this command is received in step 5206, and used to determine (in step 5207) whether an error occurred.

If an error did not occur, the printing apparatus may be off-line for some reason other than an error; this reason is therefore investigated (step 5208), and the appropriate action is taken (step 5209). To determine this reason, the host computer outputs real-time command [GS][R][1], and receives in response information that, for example, the cover is open or that there is no paper. The host computer can then display a user prompt such as "please close the cover" or "please add paper" on display device 5302 to aid the user in correcting the problem.

This sequence is repeated until the printing apparatus comes on-line again (step 5210), at which point printing is resumed from step 5201.

If step 5207 determines that an error has occurred, it is determined whether the error is recoverable (step 5211); this determination is based on the bit 5 value shown in Table 4. If the error is recoverable, the user is notified that an error has occurred, and can be requested to check the expected cause of the error, e.g., a paper jam. The location of the paper jam can also be reported to the user as being in the carriage or the automatic paper cutter based on the state of bits 2 and 3 in Table 4. After the user corrects the paper jam, the user confirms that the cause of the error has been corrected using input device 5303 (e.g., a keyboard) of the host computer (step 5213). Real-time command [GS][R][6] or [7] is then output to reset the printing apparatus from the error. Because it is possible that the user has not completely corrected the cause of the error, or that plural errors occurred simultaneously, the process after error recovery will preferably resume from step 5205 to check again for errors.

If step 5211 determines that the error is non-recoverable, there is a problem in the printing apparatus that may not be correctable by the user. In this case, the user is informed that there is a problem in the printing apparatus (step 5215), and printing is stopped (step 5216).

In a data processing apparatus such as POS and ECR terminals where monetary transactions are handled, data loss and duplication are impermissible. When an error occurs in the printing apparatus, it is important to recover from the error without destroying the data already received, and to resume printing. However, to maintain compatibility with data processing apparatuses using conventional printing apparatuses, a mode for recovering after deleting the already received data is also enabled, and this mode can be selected by a control command from the host computer. More specifically, in data processing apparatuses using conventional printing apparatuses, the data already received is always destroyed after the printing apparatus recovers from the error. When the same data is printed after error recovery as before the error occurred, a special character is printed at the beginning of the line to indicate that the data in that line has been printed twice. A mode for error recovery after destroying the data already received is therefore necessary to maintain compatibility with this operation.

By means of the invention thus described, the host computer can determine why the printing apparatus has gone off-line while the printing apparatus is off-line.

Furthermore, by providing a data receiving means and real-time command interpreting means in the receive interrupt process, commands can be interpreted and recovery from a cut-sheet form insertion wait-state is possible even during the cut-sheet form insertion wait-state.

In addition, when the cause of the off-line status is an error, the host computer can determine whether the error is recoverable; if it is recoverable, the user can be notified where the error occurred, and printing can be resumed without destroying the data already received once the cause of the error is corrected.

When recovering from an error, it is also possible to choose to resume printing after destroying the data already transmitted to the printing apparatus, or to resume printing from the line at which the error occurred.

As a result, it is possible to provide a printing apparatus featuring high reliability and a high throughput rate; to provide a user-friendly printing apparatus reducing the host computer overhead; and to provide a data processing apparatus using said printing apparatuses for use as a printing apparatus used in monetary transactions in the distribution industry.

Fifth Embodiment

A fifth embodiment of the invention is described below with reference to the accompanying figures.

Figure 24:
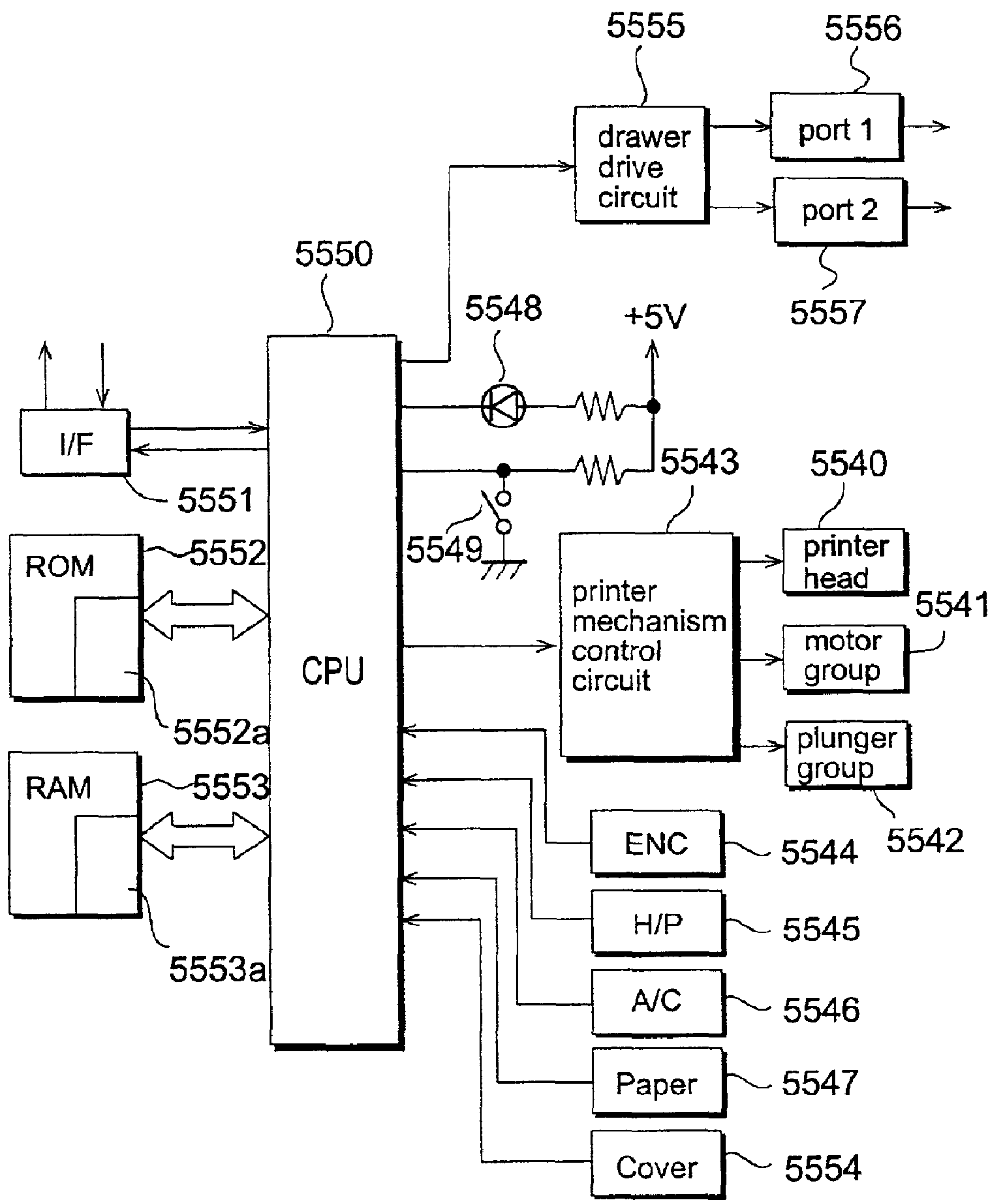
FIG. 24 is a circuit block diagram of a control circuit achieving a fifth embodiment of the present invention.

FIG. 24 is a block diagram of the control circuit achieving the fourth embodiment of the invention.

Figure 25:
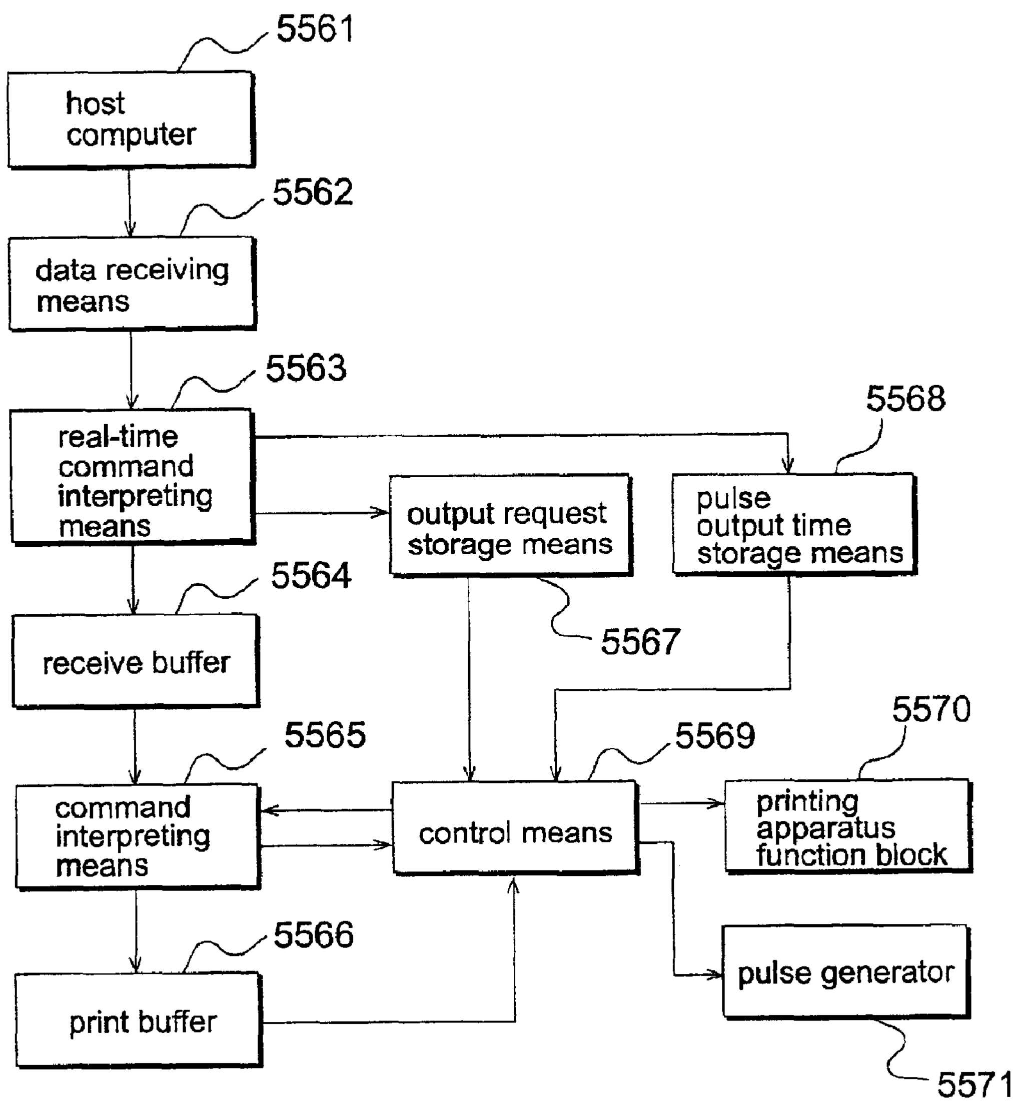
FIG. 25 is a circuit block diagram of a control circuit used to describe the fifth embodiment of the present invention.

Connected to CPU 5550, which controls the entire printing apparatus, are cover sensor 5547 for detecting whether the cover is open; panel switch 5549 for manual paper feed control; an interface 5551 to the host computer 5561; non volatile memory, such as read only memory or ROM 5552 for storing the control program 552*a*, printer character patterns, and other data; and memory, such as random access memory or RAM 5553 comprising the receive buffer 5564 and print buffer 5566 shown in FIG. 25.

The print data input through interface 5551 is stored to the receive buffer 5564 of RAM 5553. CPU 5550 then interprets this data, reads the character pattern corresponding to the data code from ROM 5552, and controls printer mechanism control circuit 5543 to accomplish the printing process. More specifically, CPU 5550 controls the ink jet head or other print head 5540, and motor group 5541 for driving print head 5540 and the recording medium; and drives plungers 5542 to hold cut-sheet forms or switches the recording medium transport path as necessary when the printing apparatus is designed to print to plural media by means of printer mechanism control circuit 5543 to print.

Pulse generation control commands for requesting supply of a control or drive pulse to the cash drawer or other external device connected to the printing apparatus are input through interface 5551. The input pulse generation control command is interpreted by CPU 5550, which outputs a pulse from port 5556 or port 5557 through drawer drive circuit 5555. The determination of which port to be used for pulse output is specified using a parameter of the pulse generation control command as will be described below.

Figure 28:
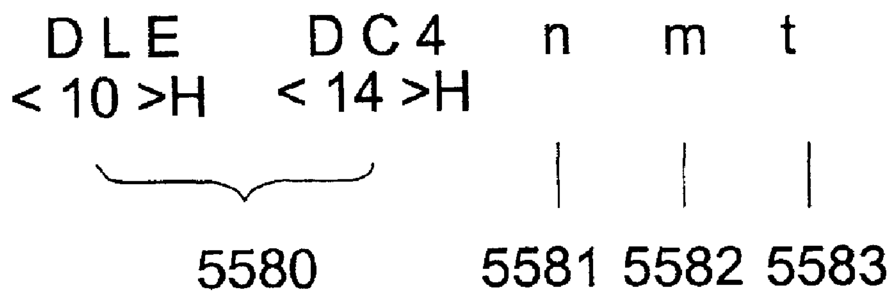
FIG. 28 is used to describe the preferred command code used in the present invention.

An example of a real-time command code executed immediately after being received is shown in FIG. 28. Each of the command code components DLE, DC4, and the values n, m, and t in FIG. 28 is one byte expressed in hexadecimal code as 10h, 14h, and the hexadecimal value corresponding to n, m, and t.

DLE and DC4 identify a real-time command, and select the content (operation) to be executed based on the value of n. When n=1, the command is interpreted as a real-time output command, and the above process is immediately executed. Parameter m defines the port number of the pulse output port; t defines the pulse output time.

FIG. 25 is a functional block diagram of the overall configuration of the fifth embodiment of the present invention, and shows the relationship between the various function means. Host computer 5561 transfers the command data and print data to the printing apparatus. Data receiving means 5562 receives the data code from host computer 5561 through the interface, and is achieved in the fifth embodiment by means of an interrupt process started by interface 5551. The received data are interpreted immediately upon being received by real-time command interpreting means 5563, implemented as part of the interrupt process for data receiving means 5562.

Real-time command interpreting means 5563 determines whether the received data is a real-time control command, and causes the specified process to be executed according to the command specification if it is a real-time control command. All data received through real-time command interpreting means 5563 is stored temporarily to receive buffer 5564. Command interpreting means 5565 reads the received data in a first-in-first-out sequence in single data units, e.g., one byte at a time, interprets the data code, and discriminates the print data from the command data used to set various printing apparatus control parameters.

The interpretation of the data stored in receive buffer 5564 by command interpreting means 5565 is executed in response to a request from control means 5569. When the printing apparatus is in an idle state, for example, after a printing job is completed, control means 5569 repeats checking whether receive buffer 5564 is empty in a normal idling routine. And, if there is data in receive buffer 5564, control means 5569 causes command interpreting means 5565 to perform the command interpretation as described above.

It should be noted that while the data from data receiving means 5562 in the present embodiment is stored to receive buffer 5564 through a real-time command interpreting means, the present invention shall not be so limited. It is also possible, for example, to store the data from data receiving means 5562 to receive buffer 5564 while also passing the data to real-time command interpreting means 5563 in parallel.

Command data is processed by control means 5569. More specifically, particular settings are made according to the command data, or particular operations are performed. If the received data is print data, the character pattern is stored to print buffer 5566 according to the data code. When printing is executed by control means 5569, the print pattern is read from print buffer 5566 to control printing apparatus function block 570 and print.

As shown in FIG. 24, printing apparatus function block 5570 comprises primarily printer mechanism control circuit 5543, print head 5540, motor group 5551, and plunger group 5542.

When real-time command interpreting means 5563 determines that the received data is a real-time pulse output command, the information indicating that a pulse output request was received is stored to output request storage means 5567, which is implemented as a portion of RAM 5553. This can be accomplished, for example, by setting a particular flag. The pulse output time is also stored as information in pulse output time storage means 5568, and is supplied to control means 5569. The output port number, another parameter of the command, may be separately stored in another storage means provided in RAM 553 or a respective request flag is provided for each port number.

Control means 5569 monitors the real-time pulse output request information by polling output request storage means 5567. When a real-time pulse output request is detected, control means 5569 outputs a pulse according to the information in the storage means to the specified port by means of pulse generator 5571.

When the cover is open or paper is being fed using the paper transport switch, control means 5569 enters an off-line state as described above. More specifically, reading and executing commands from receive buffer 5564 stops to assure operator safety when the printing apparatus cover is open to, for example, supply the paper. Because receive buffer 5564 may overflow if data continue to be stored to receive buffer 5564 in this state, the printing apparatus notifies the host device that data sent thereafter are not guaranteed to be received. This state is called the "off-line" state.

When control means 5569 is in the off-line state, control means 5569 only monitors data input from data receiving means 5562, and cannot activate command interpreting means 5565. Real-time command interpreting means 5563 continues to operate irrespective of the off-line status while control means 5569 monitors data input. The present embodiment is also constructed to output the current pulse driving a solenoid built into the cash drawer. Pulse generator 5571 and printing apparatus function block 5570 also share the same power supply. If the power supply does not have sufficient capacity to simultaneously drive both pulse generator 5571 or the solenoid and printing apparatus function block 5570, control means 5569 may only be able to drive one of the devices during printing or pulse generation.

Figure 26:
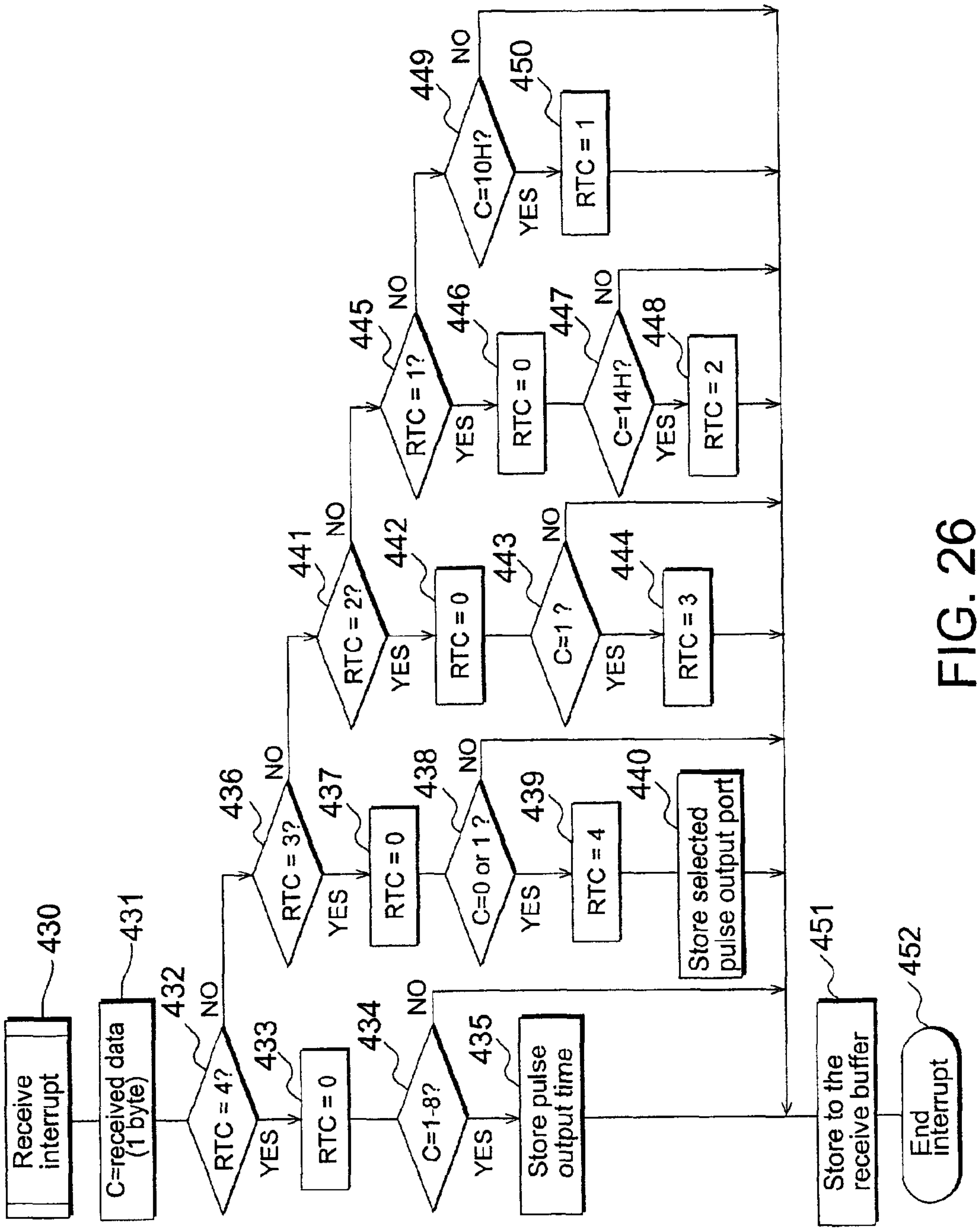
FIG. 26 is a flow chart showing the sequence of the fifth embodiment of a control method according to the present invention.
Figure 27:
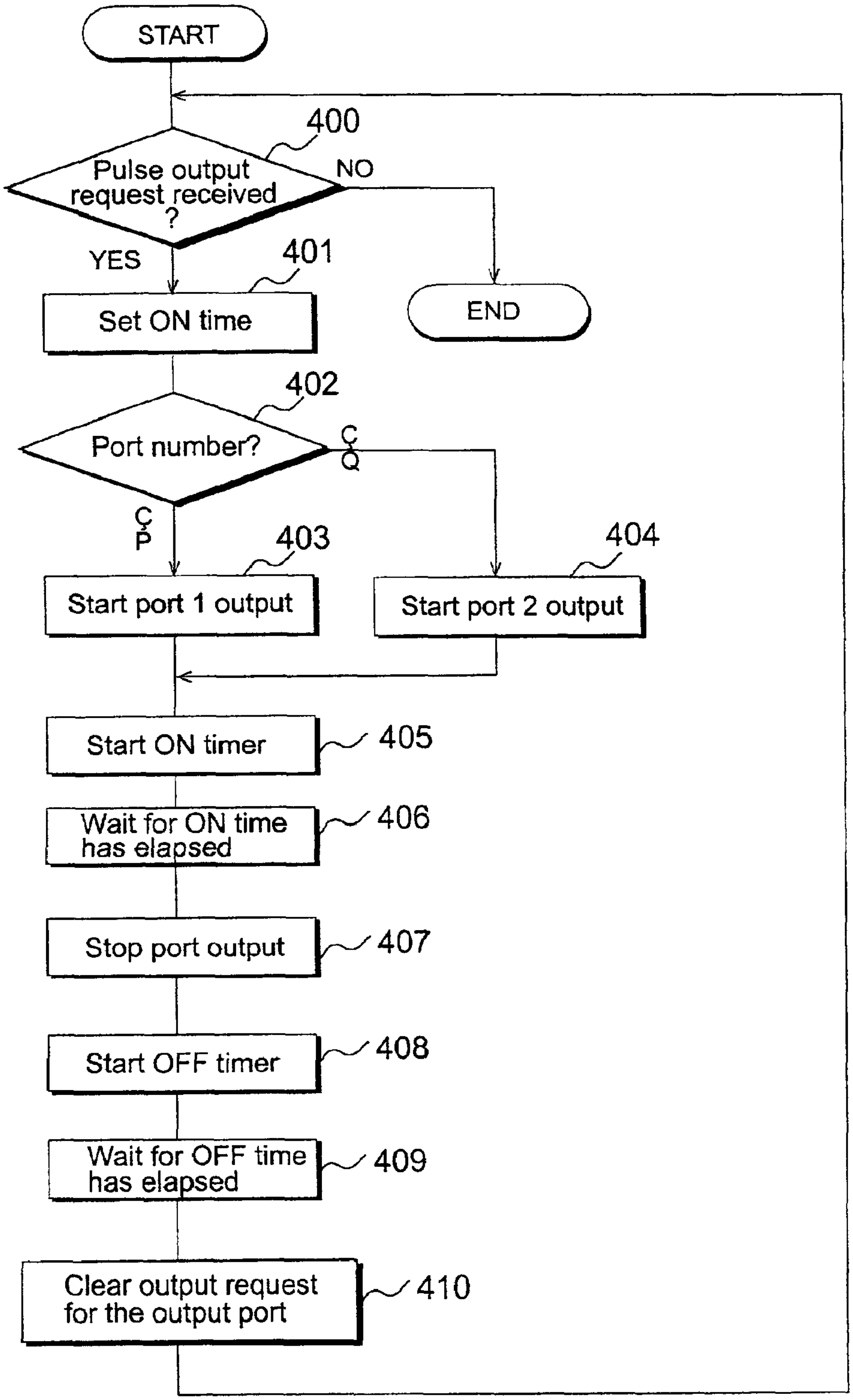
FIG. 27 is a flow chart showing the sequence of the fifth embodiment of a control method according to the present invention.

FIGS. 26 and 27 are flow charts of the preferred printing apparatus control method according to the present invention. FIG. 26 shows the sequence of the receive interrupt process of the interface, and thus shows the data receiving means 562 and real-time command interpreting means 5563. Data received from the host computer through interface 5551 is received in data units of a particular size, which is defined as one byte by way of example only in the present embodiment, and the process shown in FIG. 26 is therefore executed each time one data byte is received. The real-time command contains five bytes (DLE, DC4, n, m, and t) as shown in FIG. 28, and is therefore analyzed using a data counter RTC indicating which data byte was received.

RTC is cleared to zero before data receiving means 5562 starts receiving the data from the host device in, for example, a power-on initialization procedure of the printing apparatus.

A memory area for storing the port number of the pulse output port defined by parameter m, and a memory area (5568) for storing the pulse output time defined by parameter t, are also provided.

When the process starts at step 430, data is received and a receiving interrupt is started.

The received data is read through the interface at step 431, and it is determined whether the RTC counter is set to 4 in step 432. If the RTC counter is set to 4, i.e., if DLE, DC4, 1, and m have been received, the received data ("C" in this example) is processed as parameter t. The RTC counter is then cleared in step 433.

If the value of the received data (C) is from 1 to 8 (step 434), the pulse output time is stored to a specific address in RAM 5553 in step 435. Note that all received data is initially stored to the receive buffer, even real-time commands (step 451).

If the value of the received data (C) is outside the range from 1 to 8 (step 434), the counter remains cleared and the data is stored to receive buffer 5564 (step 451). Such values are illegal parameters and therefore prohibit the complete command from being processed. The data is nevertheless stored to receive buffer 5564 because it may be part of the print data.

If the RTC counter does not equal 4 in step 432, it is determined whether the RTC counter equals 3 in step 437. More specifically, the RTC counter is set to 3 if DLE, DC4, and 1 have been received. The RTC counter is therefore cleared in step 437, and it is determined whether the received data (C) is 0 or 1 (step 438). If C is 0 or 1, the RTC counter is set to 4 (step 439), and the pulse output port number corresponding to the value of C is stored to RAM 5553 (step 440). The received data is also stored to the receive buffer (step 451). If the value of the received data (C) is not 0 or 1 (step 438), the counter remains cleared and the data is stored to the receive buffer (step 451) for the same reason described above.

If the RTC counter does not equal 3 in step 436, it is determined whether the RTC counter equals 2 in step 441. More specifically, the RTC counter is set to 2 if DLE and DC4 have been received. The RTC counter is therefore cleared in step 442, and it is determined whether the received data (C) is 1 (step 443). If C is 1, the RTC counter is set to 3 (step 444), and the received data is stored to the receive buffer (step 451).

If the value of the received data (C) is other than 1 (step 443), the counter remains cleared and the data is stored to the receive buffer (step 451).

Note that parameter n is used to identify the real-time command operation. When n=1, pulse generation processing is accomplished. When n does not equal 1, i.e., is a value other than 1, a different real-time process may be executed. Because other real-time processes are not defined in the present embodiment, such real-time processing does not occur.

If the RTC counter does not equal 2 in step 441, it is determined whether the RTC counter equals 1 in step 445. More specifically, the RTC counter is set to 1 if DLE has been received. The RTC counter is therefore cleared in step 446, and it is determined whether the received data (C) is DC4 (step 447). If C is DC4, the RTC counter is set to 2 (step 448), and the received data is stored to the receive buffer (step 451).

If the value of the received data (C) is other than 14h (step 447), the counter remains cleared and the data is stored to the receive buffer (step 451).

If the RTC counter does not equal 1 in step 445, it is determined whether the received data (C) is the DLE code (step 449).

If C is DLE, the RTC counter is set to 1 (step 450); if not, the received data is stored to the receive buffer (step 451) and the receive interrupt process is terminated (step 452).

If in step 449 the value of C is other than DLE (10h), the counter remains cleared and the data is written to the receive buffer (step 451).

The pulse output control means is described next with reference to the flow chart in FIG. 27.

Control means 5569 monitors real-time pulse output request represented by the output request flag stored in output request storage 5567, and reads the pulse ON time from the pulse output time storage means 5568 (step 401) when a real-time pulse output request is detected (step 400 returns YES).

The pulse output port number is read from the output request storage means 5567 (step 402), and the pulse is output (step 403 or step 404).

A timer counting the ON time is activated (step 405), the process waits for the ON time period (step 406), pulse output to the port is then stopped (step 407), the OFF time counter is started (step 408), and the process waits for the OFF time (step 409). When the OFF time has passed, the output request flag for the port for which an output request was issued is cleared (step 410), and the process loops back to step 400 to determine whether the next output request was received. If there is no output request, the process continues to look for the next output request.

It should be noted that the OFF time in the present embodiment is set to the same time as the ON time specified by command. It is also possible, however, to set the OFF time by means of a command parameter using a process similar to that described above. Note that the OFF time is set and pulse output requests are effectively prohibited during this OFF time period to limit the drive duty of the control object. More specifically, if an OFF time is not defined and commands are transferred continuously, the ON state duty of the control pulse may be excessively large.

The pulse output process shown in FIG. 27 in the present embodiment is executed during the standby loop of the printing apparatus control program executed by CPU 5550. This loop is therefore not executed during the printing process, and the pulse output process is therefore not executed. In this case, the pulse output process is executed when one printing process is completed and the control program returns to the standby loop to start the next process.

However, if it is necessary to execute the pulse output process irrespective of the printing process, the process can be executed by means of an internal interrupt, timer interrupt, or other known interrupt process.

If there is sufficient power supply capacity, the printing process and pulse output process can be executed in parallel. More specifically, the ON time standby period (step 406) and the OFF time standby period (step 409) in FIG. 27 can be used to easily achieve parallel printing and pulse output processes by means of time-shared printing control. Furthermore, the printing process functions can be handled by printer mechanism control circuit 5543 using a microcontroller, for example, and the pulse output process can be executed in parallel by CPU 5550.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printing apparatus comprising:

a data receiver to receive data from a host device and output the received data;

a memory to store the data output by the data receiver;

a printer controller to read out the data stored in the memory in a first-in-first-out order and control the printing apparatus in accordance with the data;

a command detector to detect a predetermined command within the data directly input from the data receiver; and a state controller to change a state of the printing apparatus from an off-line state to an on-line state in accordance with the predetermined command detected by the command detector.

2. A printing apparatus according to claim 1, wherein the state controller changes the state of the printing apparatus substantially simultaneously with the printer controller controlling the printing apparatus.

3. A printing apparatus according to claim 1, wherein the state controller changes the state of the printing apparatus with a higher priority than a priority of the printer controller controlling the printing apparatus.

4. A printing apparatus according to claim 1, wherein the predetermined command comprises plural data units of a predetermined size, and wherein the command detector comprises:

a data counter for counting a number of data units, and a comparator to compare a data unit received by the data receiver with a command pattern representing the predetermined command in accordance with the data counter.

5. A printing apparatus according to claim 1, wherein the data receiver receives data from the host device while interrupting the printer controller controlling the printing apparatus.

6. A printing apparatus according to claim 1, wherein the command detector detects predetermined command from the data input from the data receiver while interrupting the printer controller controlling the printing apparatus.

7. A printing apparatus comprising:

a data receiver to receive data from a host device;

a memory to store the data received by the data receiver;

a printer controller to read out the data stored in the memory in a first-in-first-out order and control the printing apparatus in accordance with the data;

a command detector to detect a predetermined command within the data received by the data receiver upon reception thereof; and a state controller to change a state of the printing apparatus from an off-line state to an on-line state in accordance with the predetermined command detected by the command detector.

8. A printing apparatus according to claim 7, wherein the state controller changes the state of the printing apparatus while the printer controller controls the printing apparatus.

9. A printing apparatus according to claim 7, wherein the state controller changes the state of the printing apparatus while interrupting the printer controller controlling the printing apparatus.

10. A printing apparatus according to claim 7, wherein the predetermined command comprises plural data units of a predetermined size, and wherein the command detector comprises:

a data counter to count a number of data units, and a comparator to compare a data unit received by the data receiver with a data pattern representing the predetermined command in accordance with the data counter.

11. A printing apparatus according to claim 7, wherein the data receiver interrupts the printer controller to receive the data from the host device.

12. A printing apparatus according to claim 7, wherein the command detector detects the predetermined command within the data received by the data receiver while interrupting the printer controller controlling the printing apparatus.

13. A method for controlling a printing apparatus comprising the steps of:

(a) receiving data from a host device;

(b) storing in a memory the data received in step (a);

(c) reading the data stored in step (b) in a first-in-first-out order and controlling the printing apparatus according to the data;

(d) detecting predetermined command within the data received in step (a) upon reception of the data in step (a); and (e) changing a state of the printing apparatus from an off-line state to an on-line state in accordance with the predetermined command detected in step (d).

14. A control method according to claim 13, wherein step (e) is executed while the control process is executed in step (c).

15. A control method according to claim 13, wherein step (e) is executed while the process in step (c) is interrupted.

16. A control method according to claim 13, wherein in step (d) the predetermined command from the host device comprises plural data units of a predetermined size, and wherein step (d) comprises the steps of:

counting a number of data units, and comparing a data unit received in step (a) with a data pattern representing the predetermined command in accordance with the number of data units counted.

17. A printing apparatus comprising:

(a) a data receiver to receive data from a host device;

(b) a memory to store the data received by the data receiver;

(c) a command interpreter to interpret a predetermined command within the data received by the data receiver before storing the data in the memory;

(d) a state controller to change a state of the printing apparatus from an off-line state to an on-line state in accordance with the predetermined command interpreted by the command interpreter; and (e) a printer controller to read the data stored in the memory in a first-in-first-out order and control the printing apparatus in accordance with the data.

18. A printing apparatus according to claim 17, wherein the command interpreter interprets the predetermined command while the control operation of the printer controller is interrupted.

19. A printing apparatus according to claim 17, wherein the command interpreter interprets the predetermined command even while the printing apparatus is in an off-line state.

20. A printing apparatus according to claim 17, wherein the state controller changes the state of the printing apparatus while the operation of the printer controller is interrupted.

21. A printing apparatus according to claim 17, wherein the predetermined command is not stored in the memory.

22. A printing apparatus according to claim 17, wherein all of the data received by the data receiver is stored in the memory.

23. A method of controlling a printing apparatus comprising the steps of:

(a) receiving data from a host device;

(b) storing the data received in step (a);

(c) interpreting a predetermined command within the data received in step (a) before storing the data in step (b);

(d) changing a state of the printing apparatus from an off-line state to an on-line state in accordance with the predetermined command interpreted in step (c); and (e) reading the data stored in step (b) to control the printing apparatus.

24. A control method according to claim 23, wherein step (d) is executed while the control process is executed in step (e).

25. A control method according to claim 23, wherein step (d) is executed with priority over the control process in step (e).

26. A control method according to claim 23, wherein step (d) is executed while the control process of step (e) is interrupted.

27. A control method according to claim 23, wherein at least steps (a), (c), and (d) continue to be executed even while the printing apparatus is in an off-line state.

28. A printing apparatus comprising:

a data receiver to receive data from a host device;

a memory to store the data received by the data receiver;

a printer controller to read out the data stored in the memory in a first-in-first-out order and control the printing apparatus in accordance with the data;

a command detector to detect a predetermined command within the data received by the data receiver upon reception thereof, and notify the printer controller of detection of the predetermined command; and wherein, the printer controller changes a state of the printing apparatus from an off-line state to an on-line state in accordance with the predetermined command with a priority over the data read out from the memory when the command detector notifies the printer controller of detection of the predetermined command.

29. A printing apparatus comprising:

a data receiver to receive data from a host device and output the received data;

a memory to store the data output by the data receiver;

a first printer controller to read out the data stored in the memory in a first-in-first-out order and control the printing apparatus in accordance with the data;

a command detector to detect a predetermined command within the data directly input from the data receiver;

an operation detector to detect a predetermined manual operation by an operator of the printing apparatus; and a second printer controller to perform a predetermined control operation in accordance with the predetermined manual operation detected by the operation detector;

wherein the second printer controller performs substantially the same control operation as the predetermined control operation in accordance with the predetermined command detected by the command detector.

30. A printing apparatus according to claim 29, wherein the second printer controller performs the control operation substantially simultaneously with the first printer controller controlling the printing apparatus.

31. A printing apparatus according to claim 29, wherein the second printer controller performs the control operation with a higher priority than a priority of the first printer controller controlling the printing apparatus.

32. A printing apparatus according to claim 29, wherein the predetermined command comprises plural data units of a predetermined size, and wherein the command detector comprises:

a data counter for counting a number of data units, and a comparator to compare a data unit received by the data receiver with a command pattern representing the predetermined command in accordance with the data counter.

33. A printing apparatus according to claim 29, wherein the data receiver receives data from the host device while interrupting the first printer controller controlling the printing apparatus.

34. A printing apparatus according to claim 29, wherein the command detector detects a predetermined command from the data input from the data receiver while interrupting the first printer controller controlling the printing apparatus.

35. A printing apparatus comprising:

a data receiver to receive data from a host device;

a memory to store the data received by the data receiver;

a first printer controller to read out the data stored in the memory in a first-in-first-out order and control the printing apparatus in accordance with the data;

a command detector to detect a predetermined command within the data received by the data receiver upon reception thereof;

an operation detector to detect a predetermined manual operation by an operator of the printing apparatus; and a second printer controller to perform a predetermined control operation in accordance with the predetermined manual operation detected by the operation detector;

wherein the second printer controller performs substantially the same control operation as the predetermined control operation in accordance with the predetermined command detected by the command detector.

36. A printing apparatus according to claim 35, wherein the second printer controller performs the control operation while the first printer controller controls the printing apparatus.

37. A printing apparatus according to claim 35, wherein the second printer controller performs the control operation while interrupting the first printer controller controlling the printing apparatus.

38. A printing apparatus according to claim 35, wherein the predetermined command comprises plural data units of a predetermined size, and wherein the command detector comprises:

a data counter to count a number of data units, and a comparator to compare a data unit received by the data receiver with a data pattern representing the predetermined command in accordance with the data counter.

39. A printing apparatus according to claim 35, wherein the data receiver interrupts the first printer controller to receive the data from the host device.

40. A printing apparatus according to claim 35, wherein the command detector detects the predetermined command within the data received by the data receiver while interrupting the first printer controller controlling the printing apparatus.

41. A method for controlling a printing apparatus comprising the steps of:

(a) receiving data from a host device;

(b) storing in a memory the data received in step (a);

(c) reading the data stored in step (b) in a first-in-first-out order and controlling the printing apparatus according to the data;

(d) detecting a predetermined command within the data received in step (a) upon reception of the data in step (a); and (e) detecting a predetermined manual operation by an operator of the printing apparatus; and (f) performing a predetermined control operation in accordance with the predetermined manual operation detected in step (e);

(g) performing a control operation substantially the same as the predetermined control operation in accordance with the predetermined command detected in step (d).

42. A control method according to claim 41, wherein step (g) is executed while the control process is executed in step (c).

43. A control method according to claim 41, wherein step (g) is executed while the process in step (c) is interrupted.

44. A control method according to claim 41, wherein in step (d) the predetermined command from the host device comprises plural data units of a predetermined size, and wherein step (d) comprises the steps of:

counting a number of data units, and comparing a data unit received in step (a) with a data pattern representing the predetermined command in accordance with the number of data units counted.

45. A printing apparatus comprising:

(a) a data receiver to receive data from a host device;

(b) a memory to store the data received by the data receiver;

(c) a command interpreter to interpret a predetermined command within the data received by the data receiver before storing the data in the memory;

(d) an operation detector to detect a predetermined manual operation by an operator of the printing apparatus;

(e) a first printer controller to perform a predetermined control operation in accordance with the predetermined manual operation detected by the operation detector, the first printer controller performing substantially the same control operation as the predetermined control operation in accordance with the predetermined command detected by the command detector; and (f) a second printer controller to read the data stored in the memory in a first-in-first-out order and control the printing apparatus in accordance with the data.

46. A printing apparatus according to claim 45, wherein the command interpreter interprets the predetermined command while the control operation of the second printer controller is interrupted.

47. A printing apparatus according to claim 45, wherein the command interpreter interprets the predetermined command even while the printing apparatus is in an off-line state.

48. A printing apparatus according to claim 45, wherein the first printer controller performs the control operation while the operation of the second printer controller is interrupted.

49. A printing apparatus according to claim 45, wherein the predetermined command is not stored in the memory.

50. A printing apparatus according to claim 45, wherein all of the data received by the data receiver is stored in the memory.

51. A method of controlling a printing apparatus comprising the steps of:

(a) receiving data from a host device;

(b) storing the data received in step (a);

(c) interpreting predetermined command within the data received in step (a) before storing the data in step (b);

(d) detecting a predetermined manual operation by an operator of the printing apparatus;

(e) performing a predetermined control operation in accordance with the predetermined manual operation detected in step (d);

(f) performing a control operation substantially the same as the predetermined control operation in accordance with the predetermined command interpreted in step (c); and (g) reading the data stored in step (b) to control the printing apparatus.

52. A control method according to claim 51, wherein step (f) is executed while the control process is executed in step (g).

53. A control method according to claim 51, wherein step (f) is executed with priority over the control process in step (g).

54. A control method according to claim 51, wherein step (f) is executed while the control process of step (g) is interrupted.

55. A control method according to claim 51, wherein at least steps (a), (c), and (f) continue to be executed even while the printing apparatus is in an off-line state.

56. A printing apparatus comprising:

a data receiver to receive data from a host device;

a memory to store the data received by the data receiver;

an operation detector to detect a predetermined manual operation by an operator of the printing apparatus;

a printer controller to read out the data stored in the memory in a first-in-first-out order and control the printing apparatus in accordance with the data, the printer controller performing a predetermined control operation in accordance with the predetermined manual operation detected by the operation detector;

a command detector to detect predetermined command within the data received by the data receiver upon reception thereof, and notify the printer controller of detection of the predetermined command;

wherein the printer controller performs substantially the same control operation as the predetermined control operation in accordance with the predetermined command detected by the command detector with a priority over the data read out from the memory when the command detector notifies the printer controller of detection of the predetermined command.

* * * * *